(12) United States Patent
Suzuki et al.

(10) Patent No.: US 10,101,850 B2
(45) Date of Patent: Oct. 16, 2018

(54) DISPLAY DEVICE AND INPUT DEVICE

(71) Applicant: Japan Display Inc., Tokyo (JP)

(72) Inventors: Takafumi Suzuki, Tokyo (JP); Koji Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 22 days.

(21) Appl. No.: 15/354,276

(22) Filed: Nov. 17, 2016

(65) Prior Publication Data

US 2017/0160862 A1 Jun. 8, 2017

(30) Foreign Application Priority Data

Dec. 4, 2015 (JP) ................................ 2015-237257

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0416; G06F 3/044; G06F 3/0412
See application file for complete search history.

(56) References Cited

U.S. PATENT DOCUMENTS

| | | | |
|---|---|---|---|
| 9,069,425 B2 | 6/2015 | Shin et al. | |
| 2009/0244019 A1* | 10/2009 | Choi | G06F 3/0482 345/173 |
| 2009/0309851 A1* | 12/2009 | Bernstein | G06F 3/0416 345/174 |
| 2010/0253638 A1* | 10/2010 | Yousefpor | G06F 3/0412 345/173 |
| 2012/0050216 A1* | 3/2012 | Kremin | G06F 3/0416 345/174 |
| 2013/0050116 A1 | 2/2013 | Shin et al. | |
| 2014/0184539 A1* | 7/2014 | Shin | G06F 3/0412 345/173 |
| 2014/0292709 A1* | 10/2014 | Mizuhashi | G06F 3/0416 345/174 |
| 2015/0220208 A1 | 8/2015 | Noguchi et al. | |
| 2016/0299620 A1* | 10/2016 | Huang | G02F 1/13338 |
| 2017/0076683 A1* | 3/2017 | Lee | G11C 19/28 |

FOREIGN PATENT DOCUMENTS

| | | |
|---|---|---|
| JP | 2013-045466 A | 3/2013 |
| JP | 2015164033 | 9/2015 |
| KR | 20130134007 | 12/2013 |

OTHER PUBLICATIONS

Korean Office Action dated Jun. 14, 2017 in corresponding Korean Application No. 10-20160163209.

\* cited by examiner

*Primary Examiner* — Premal R Patel
(74) *Attorney, Agent, or Firm* — K&L Gates LLP

(57) ABSTRACT

A sensing unit performs a first sensing process of sensing an approach or a contact of an object to a display panel by collectively sensing electrostatic capacitance of each of a plurality of sensing electrodes provided in a matrix pattern. Further, in a case where the approach or the contact of the object has not been sensed in the first sensing process, the sensing unit repeats the first sensing process, and in a case where the approach or the contact of the object has been sensed in the first sensing process, the sensing unit performs a second sensing process of sensing a position of the object by individually sensing the electrostatic capacitance of each of the plurality of sensing electrodes.

12 Claims, 24 Drawing Sheets

DISPLAY DEVICE AND INPUT DEVICE

CROSS-REFERENCE TO RELATED APPLICATION

The present application claims priority from Japanese Patent Application No. 2015-237257 filed on Dec. 4, 2015, the content of which is hereby incorporated by reference into this application.

TECHNICAL FIELD OF THE INVENTION

The present invention relates to a display device and an input device.

BACKGROUND OF THE INVENTION

In recent years, a technique of attaching an input device referred to as a touch panel or a touch sensor to a display surface of a display device and sensing and outputting an input position when input operations are performed by contacting the touch panel with a finger or an input tool such as a stylus pen has been known.

One sensing method for sensing contact positions at which a finger or the like has contacted the touch panel as an input device is the electrostatic capacitive method. In an electrostatic capacitive type touch panel, a plurality of capacitive elements each made up of a sensing electrode are provided in a plane of the touch panel. Then, the input positions are sensed by utilizing the characteristics that the electrostatic capacitance of capacitive elements changes when performing input operations by contacting the capacitive elements with a finger or an input tool such as a stylus pen.

For example, Japanese Patent Application Laid-Open Publication No. 2013-45466 (Patent Document 1) discloses a technique of a touch sensor device including: a touch screen having Tx lines, Rx lines crossing the Tx lines and touch sensors formed between the Tx lines and the Rx lines; and a touch screen drive circuit which senses a position of a touch input.

SUMMARY OF THE INVENTION

In such an input device, a finger approach sensing process to sense an approach or a contact of a finger is performed as a standby mode in some cases before a finger coordinate sensing process to sense a finger position, that is, a finger coordinate as a sensing mode. Further, in the finger coordinate sensing process, electrostatic capacitance of each of a plurality of sensing electrodes is individually sensed by sequentially switching and connecting the plurality of sensing electrodes one by one or in units of several sensing electrodes to a sensing circuit.

However, when electrostatic capacitance of each of a plurality of sensing electrodes is sensed by sequentially switching and connecting the plurality of sensing electrodes in units of several sensing electrodes to the sensing circuit in the finger approach sensing process like the finger coordinate sensing process, there is a problem that a time required for the sensing process becomes long or power consumption increases.

Meanwhile, when several sensing electrodes are selected from part of the plurality of sensing electrodes or a waiting time between the sensing processes to be repeated is increased in order to shorten the time required for the sensing process, there is a fear that a sensing error occurs.

The present invention has been made to solve the above-described problem of the conventional technique, and an object of the present invention is to provide an input device and a display device which can prevent or suppress occurrence of a sensing error while shortening a time required for a sensing process and reducing power consumption in a finger approach sensing process performed as a standby mode before a finger coordinate sensing process as a sensing mode.

The following is a brief description of an outline of the typical invention disclosed in the present application.

A display device as an aspect of the present invention includes: a display panel having a display surface on which images are displayed; a plurality of first electrodes provided in a matrix pattern in the display panel when seen in a plan view; and a sensing unit which senses electrostatic capacitance of each of the plurality of first electrodes. The sensing unit performs a first sensing process of selecting all or part of the plurality of first electrodes as a plurality of sensing process electrodes and collectively sensing electrostatic capacitance of each of the plurality of selected sensing process electrodes, thereby sensing an approach or a contact of an object to the display panel. In a case where the approach or the contact of the object has not been sensed in the first sensing process, the sensing unit repeats the first sensing process. In a case where the approach or the contact of the object has been sensed in the first sensing process, the sensing unit performs a second sensing process of sensing a position of the object by individually sensing the electrostatic capacitance of each of the plurality of first electrodes.

An input device as another aspect of the present invention includes: a substrate; a plurality of first electrodes provided in a matrix pattern on the substrate when seen in a plan view; and a sensing unit which senses electrostatic capacitance of each of the plurality of first electrodes. The sensing unit performs a first sensing process of selecting all or part of the plurality of first electrodes as a plurality of sensing process electrodes and collectively sensing electrostatic capacitance of each of the plurality of selected sensing process electrodes, thereby sensing an approach or a contact of an object to the substrate. In a case where the approach or the contact of the object has not been sensed in the first sensing process, the sensing unit repeats the first sensing process. In a case where the approach or the contact of the object has been sensed in the first sensing process, the sensing unit performs a second sensing process of sensing a position of the object by individually sensing the electrostatic capacitance of each of the plurality of first electrodes.

BRIEF DESCRIPTIONS OF THE DRAWINGS

DESCRIPTIONS OF THE PREFERRED EMBODIMENTS

Figure 1:
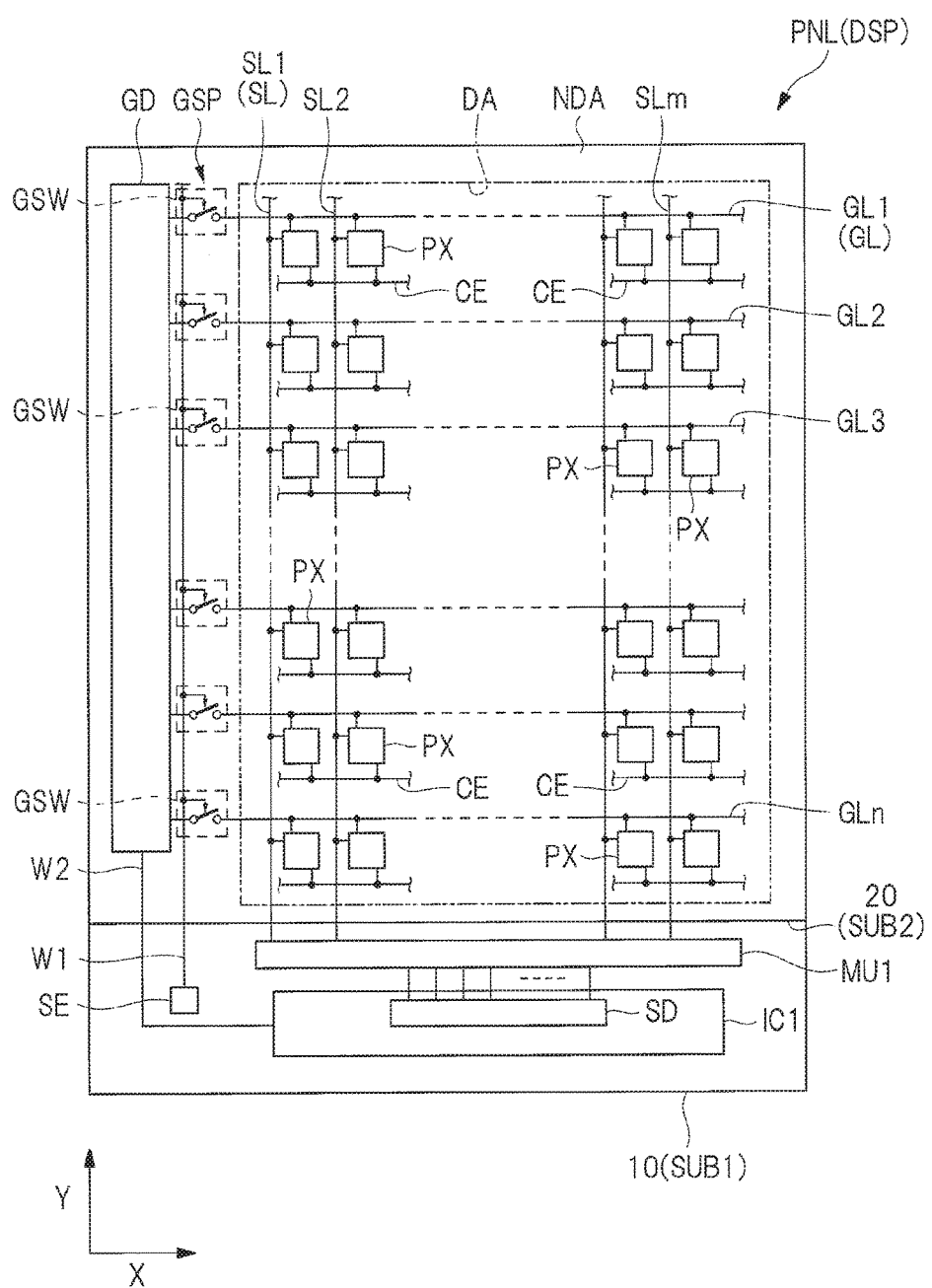
FIG. 1 is a plan view illustrating an example of a display device according to a first embodiment.

Embodiments of the present invention will be described below with reference to the drawings.

Note that the disclosures are provided by way of example, and any suitable variations easily conceived by a person with ordinary skill in the art while pertaining to the gist of the present invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

Also, in the drawings used in the following embodiments, hatching (meshing) used to discriminate structures from each other is sometimes omitted depending on the drawings.

First Embodiment

First, an example where a touch panel as an input device is applied to an in-cell type display device with touch sensing function in which sensing electrodes of the input device are provided in a display panel of the display device and function as common electrodes of the display device will be described as the first embodiment. Herein, the display device according to the first embodiment is a liquid crystal display device. In addition, in the specification of this application, the input device is an input device which senses at least electrostatic capacitance which changes in accordance with the capacitance of an object which approaches or contacts an electrode. In this case, a self-capacitive method for sensing electrostatic capacitance of one electrode can be used as a method of sensing the electrostatic capacitance. Further, the in-cell type display device with touch sensing function means a display device with touch sensing function characterized in that driving electrodes or sensing electrodes for touch sensing function as driving electrodes for displaying images on pixels.

<Display Device>

Figure 2:
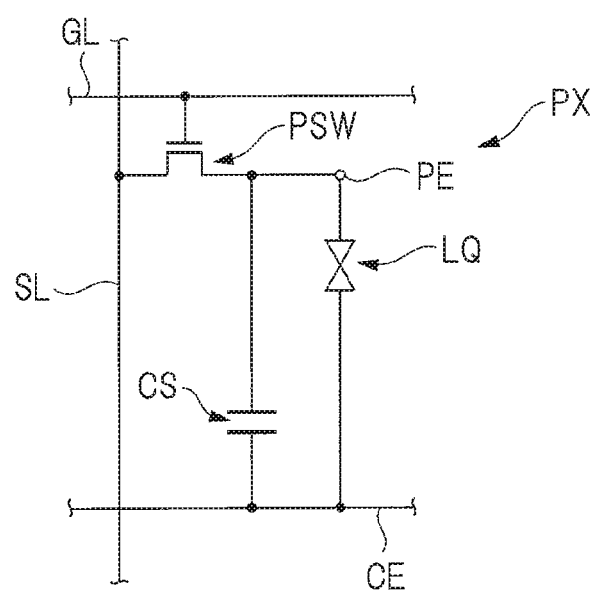
FIG. 2 is an equivalent circuit diagram illustrating a pixel of the display device according to the first embodiment.
Figure 3:
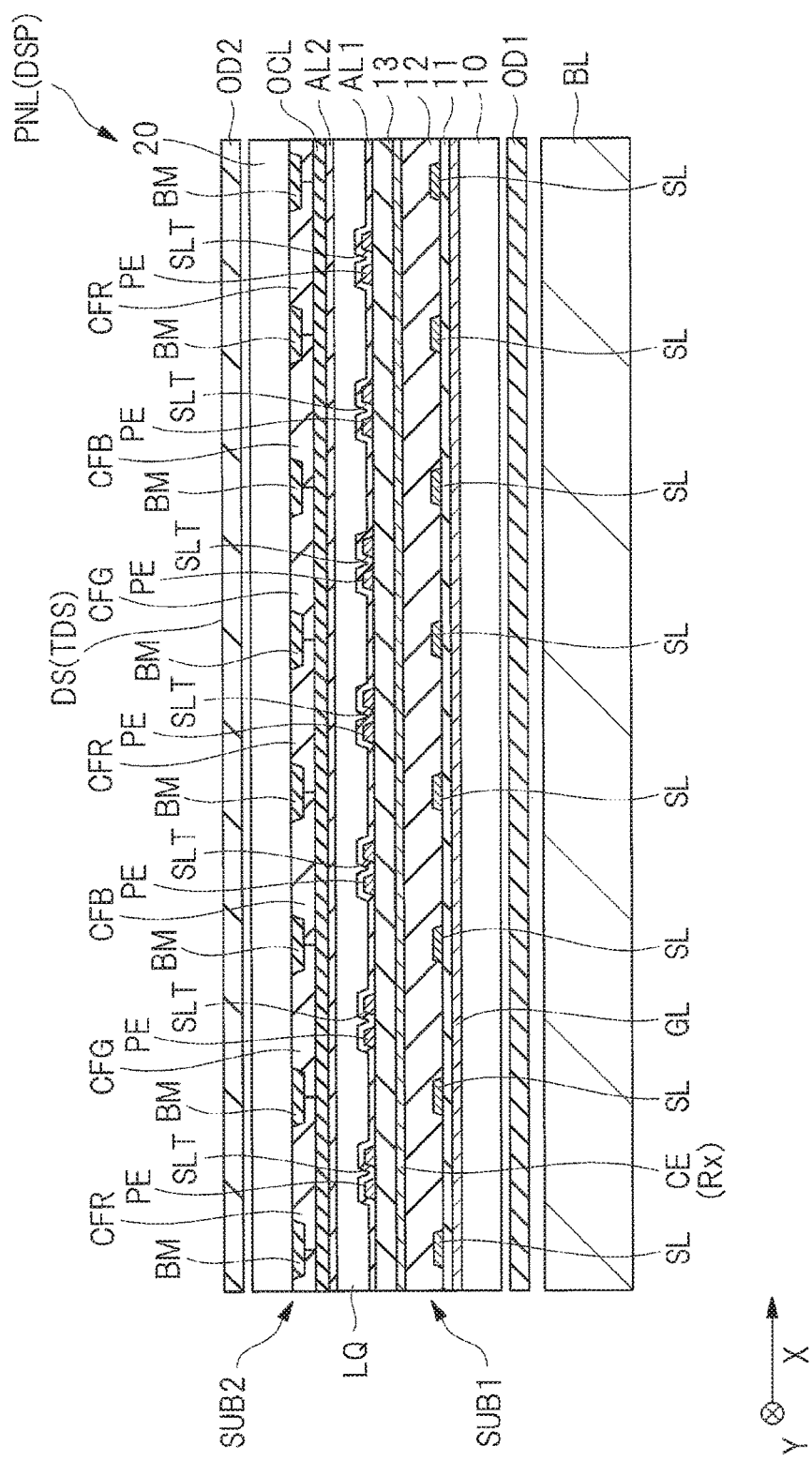
FIG. 3 is a sectional view illustrating an example of the display device according to the first embodiment.
Figure 4:
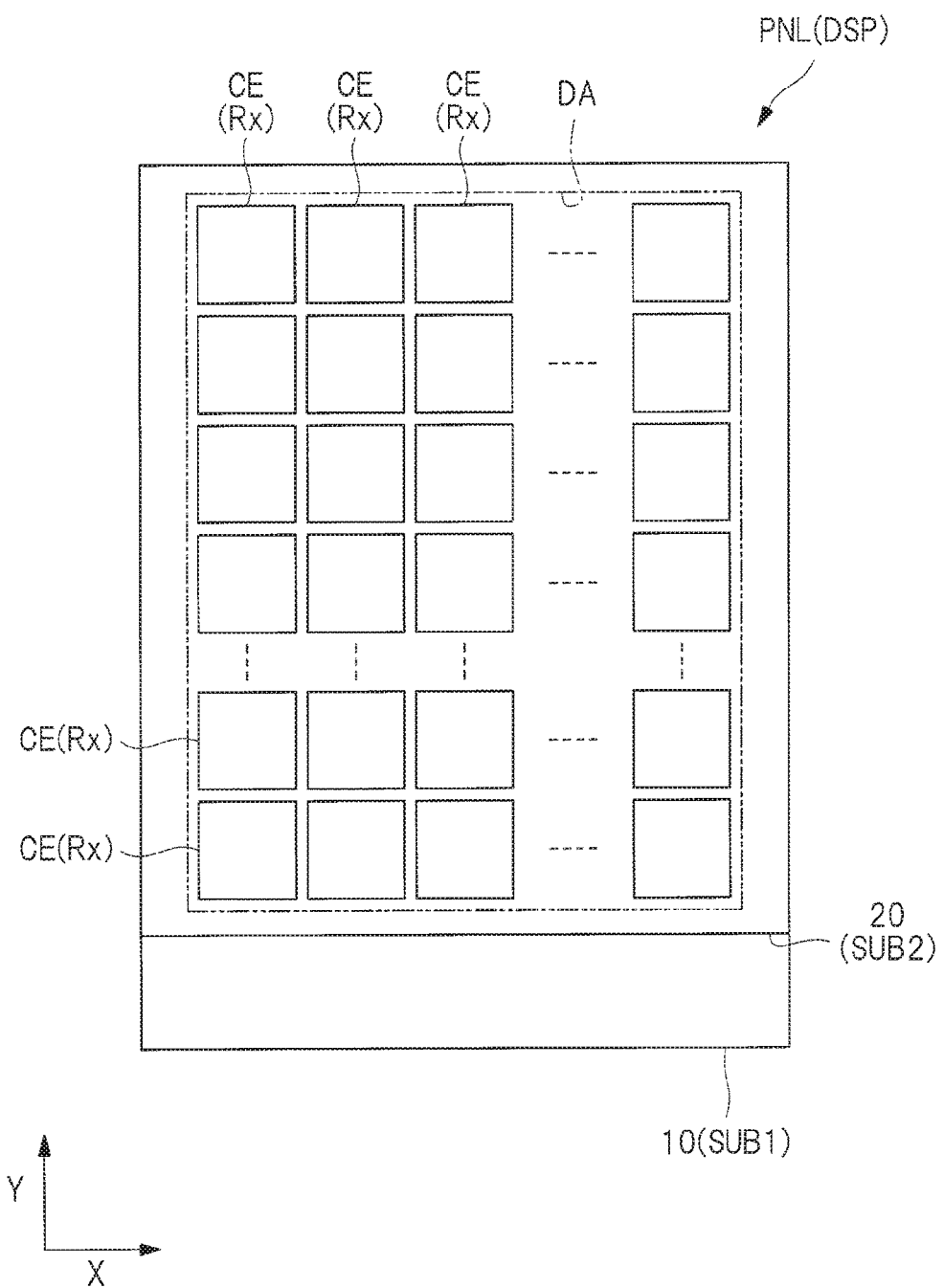
FIG. 4 is a plan view illustrating an example of an arrangement of common electrodes of the display device according to the first embodiment.

FIG. 1 is a plan view illustrating an example of the display device according to the first embodiment. FIG. 2 is an equivalent circuit diagram illustrating a pixel of the display device according to the first embodiment. FIG. 3 is a sectional view illustrating an example of the display device according to the first embodiment. FIG. 4 is a plan view illustrating an example of an arrangement of common electrodes of the display device according to the first embodiment. Note that scanning lines GL which are not actually arranged in a cross section in FIG. 3 are also illustrated in FIG. 3 as a matter of convenience.

As illustrated in FIG. 1, a display device DSP as a liquid crystal display device includes a display panel PNL as an active matrix liquid crystal display panel, a driving IC chip IC1 which drives the display panel PNL and an electrostatic capacitive sensing unit SE. The display panel PNL includes a display surface DS (see FIG. 3) on which images are displayed. Further, the sensing unit SE as a touch sensing circuit and a sensing method by the sensing unit SE will be described later with reference to FIGS. 14 to 18. In addition, although not illustrated, the display device DSP may include a control module provided outside the display panel PNL, a flexible wiring substrate which connects the display panel PNL and the control module, and a driving IC chip which drives the sensing unit SE.

As illustrated in FIGS. 1 and 3, the display panel PNL as a liquid crystal display panel includes a substrate SUB1, a substrate SUB2 which is disposed to oppose to the substrate SUB1, and a liquid crystal layer LQ which is disposed between the substrate SUB1 and the substrate SUB2. In addition, in the first embodiment, the substrate SUB1 can be paraphrased as an array substrate, and the substrate SUB2 can be paraphrased as an opposing substrate.

Further, as illustrated in FIGS. 3 and 4, the display device DSP includes a plurality of sensing electrodes Rx which are provided in a matrix pattern inside the display panel PNL. Although described later with reference to FIGS. 14 to 18, the sensing unit SE senses the electrostatic capacitance of each of the plurality of sensing electrodes Rx. Further, when the plurality of sensing electrodes Rx are provided inside the display panel PNL, the display device DSP is an in-cell type display device with touch sensing function. In addition, as described in a second embodiment below, it is also possible to provide the sensing electrodes Rx outside the display panel PNL, and the display device DSP in this case is an on-cell type display device with touch sensing function.

As illustrated in FIGS. 1 and 4, the display panel PNL includes a display area (active area) DA in which images are displayed. Two directions which cross each other and more preferably orthogonally cross each other when seen in a plan view are defined as an X axis direction and a Y axis direction. In this case, the plurality of sensing electrodes Rx are arranged in a matrix pattern in the X axis direction and the Y axis direction in the display area DA when seen in a plan view. Namely, the plurality of sensing electrodes Rx are provided in a matrix pattern in the display panel PNL when seen in a plan view. In addition, in the specification of this application, "when seen in a plan view" means that the display panel PNL is seen from a direction vertical to the display surface of the display panel PNL.

As illustrated in FIG. 3, the display device DSP includes a backlight unit BL. The backlight unit BL is disposed on a back surface side of the substrate SUB1. As this backlight unit BL, various modes are applicable. Further, a backlight unit using light emitting diodes (LED) as light sources and a backlight unit using cold cathode fluorescent lamps (CCFL) are also applicable, and descriptions of a detailed structure thereof are omitted.

As illustrated in FIG. 1, the driving IC chip IC1 is provided on the substrate SUB1 in a non-display area NDA outside the display area DA of the display panel PNL. The driving IC chip IC1 includes a signal line drive circuit SD and others.

As illustrated in FIG. 1, the display device DSP includes a multiplexer circuit MU1, a plurality of scanning lines GL, a scanning line drive circuit GD as a scanning signal output circuit which outputs scanning signals input to the plurality of scanning lines, and a switching unit GSP which switches a connection state of the scanning line drive circuit GD and the plurality of scanning lines GL. Further, the display device DSP includes a plurality of signal lines SL, a plurality of common electrodes CE and a plurality of pixels PX.

The multiplexer circuit MU1, the scanning line drive circuit GD and a common electrode drive circuit CD are provided on the substrate SUB1 in the non-display area NDA. The driving IC chip IC1 is connected to the multiplexer circuit MU1 and the scanning line drive circuit GD.

In addition, although not illustrated, a common electrode drive circuit may be provided on the substrate SUB1 in the non-display area NDA. The common electrode drive circuit switches and drives the common electrodes CE when the display device DSP displays images.

The plurality of pixels PX are disposed between the substrate SUB1 and the substrate SUB2 in the display area DA. The plurality of pixels PX are arranged in a matrix pattern in the X axis direction and the Y axis direction, and m×n pieces of pixels PX are arranged (in this case, m and n are positive integers).

In the display area DA, the scanning lines GL1, GL2, GL3 and GLn which are part of the n scanning lines GL, signal lines SL1, SL2 and SLm which are part of the m signal lines SL, and the common electrodes CE are formed above the substrate SUB1.

The plurality of scanning lines GL extend in the X axis direction and are arranged at intervals from each other in the Y axis direction. Each of the plurality of scanning lines GL is led to an outside of the display area DA, and is connected to the scanning line drive circuit GD via switching elements GSW included in the switching unit GSP. The plurality of signal lines SL extend in the Y axis direction and are arranged at intervals from each other in the X axis direction. Further, the plurality of signal lines SL cross the plurality of scanning lines GL. Each of the plurality of signal lines SL is led to an outside of the display area DA, and is connected to the multiplexer circuit MU1.

As illustrated in FIG. 4, the common electrodes CE are arranged in the matrix pattern in the X axis direction and the Y axis direction. In the first embodiment, a case where the common electrodes CE function also as the sensing electrodes Rx for touch sensing in the self-capacitive method will be described. However, the first embodiment is not limited to the case where the common electrodes CE function also as the sensing electrodes Rx. When the common electrodes CE do not function as the sensing electrodes Rx, the plurality of common electrodes CE may extend without being divided in the X axis direction and may be arranged at intervals from each other in the Y axis direction. Alternatively, the plurality of common electrodes CE may extend without being divided in the Y axis direction and may be arranged at intervals from each other in the X axis direction.

The driving IC chip IC1 is connected to the multiplexer circuit MU1 and the scanning line drive circuit GD. Further, in the example illustrated in FIG. 1, the sensing unit SE and the switching elements GSW are connected by a wiring W1, and the driving IC chip IC1 and the scanning line drive circuit GD are connected by a wiring W2. Hence, the sensing unit SE can supply a control signal to the switching elements GSW via the wiring W1. For example, as described later with reference to FIG. 16, the sensing unit SE can output a control signal (corresponding to a voltage V2 in FIG. 16) serving as an off voltage for placing the switching elements GSW in an off state (non-conducted state), and can switch all scanning lines GL to an electrically floating state (floating state). Note that the sensing unit SE may be included in the driving IC chip IC1, and the sensing unit SE included in the driving IC chip IC1 and the switching elements GSW may be connected via the wiring W1.

As illustrated in FIG. 2, each pixel PX includes a pixel switching element PSW and a pixel electrode PE. Further, the plurality of pixels PX share the common electrodes CE. The pixel switching element PSW includes, for example, a thin film transistor (TFT). The pixel switching element PSW is electrically connected to the scanning lines GL and the signal lines SL. The pixel switching element PSW may be any one of a top gate TFT and a bottom gate TFT. Further, a semiconductor layer of the pixel switching element PSW is made of, for example, polycrystalline silicon (polysilicon), or may be made of amorphous silicon.

The pixel electrodes PE are electrically connected to the pixel switching element PSW. The pixel electrodes PE oppose to the common electrodes CE via an insulating film. The common electrodes CE, the insulating film and the pixel electrodes PE form a storage capacitor CS.

As illustrated in FIG. 3, the display device DSP includes an optical element OD1 and an optical element OD2. Further, the display device DSP employs a configuration which supports a FFS (Fringe Field Switching) mode which is a transverse electric field mode as a display mode. However, the display device DSP may employ a configuration which supports another display mode such as an IPS (In Plane Switching) mode which is also the transverse electric field mode.

In addition, in the display device DSP which uses the FFS mode, the pixel electrodes PE and the common electrodes CE are provided in the substrate SUB1. Liquid crystal molecules which compose the liquid crystal layer LQ are switched by mainly using the transverse electric field formed between the pixel electrodes PE and the common electrodes CE (in particular, an electric field substantially parallel to a main surface of the substrate in a fringe electric field).

The substrate SUB1 and the substrate SUB2 are bonded so as to be separated at a uniform interval. The liquid crystal layer LQ is interposed between the substrate SUB1 and the substrate SUB2.

As illustrated in FIG. 3, the substrate SUB1 includes an insulating substrate 10 having optical transparency such as a glass substrate or a resin substrate. Further, the substrate SUB1 includes the plurality of scanning lines GL, the plurality of signal lines SL, the plurality of common electrodes CE, the plurality of pixel electrodes PE, an insulating film 11, an insulating film 12, an insulating film 13 and an alignment film AL1 on a side of the insulating substrate 10 opposing to the substrate SUB1. Note that FIG. 3 illustrates one scanning line GL and one common electrode CE.

The scanning lines GL are formed on the insulating substrate 10. The scanning lines GL are made of metal such as chromium (Cr) or molybdenum (Mo) or an alloy thereof.

The insulating film 11 is formed on the scanning lines GL and the insulating substrate 10. The insulating film 11 is a transparent insulating film made of, for example, silicon nitride or silicon oxide. Also, although not described in detail, the gate electrodes of the pixel switching elements and the semiconductor layer are formed in addition to the scanning lines GL between the insulating substrate 10 and the insulating film 11.

The signal lines SL are formed on the insulating film 11. The signal lines SL are made of a metal film with a multilayer structure formed by, for example, sandwiching aluminum (Al) by molybdenum (Mo). Further, source electrodes and drain electrodes of the pixel switching elements are also formed on the insulating film 11. In the illustrated example, the signal lines SL extend in the Y axis direction.

The insulating film 12 is formed on each of the signal lines SL and the insulating film 11. The insulating film 12 is made of, for example, acrylic photosensitive resin.

The common electrodes CE are formed on the insulating film 12. Note that the plurality of common electrodes CE are provided as described above, and function also as the sensing electrodes Rx for touch sensing. The common electrodes CE are made of a transparent conductive material such as ITO (Indium tin oxide) or IZO (Indium Zinc Oxide). In addition, when the display device is a display device of a longitudinal electric field mode such as a TN (Twisted Nematic) mode or a VA (Vertical Alignment) mode, the common electrodes CE may be formed in the substrate SUB2.

The insulating film 13 is formed on each of the common electrodes CE and the insulating film 12. The pixel electrodes PE are formed on the insulating film 13. Each pixel electrode PE is located between the two adjacent signal lines SL and opposes to the common electrode CE. Further, each pixel electrode PE includes a slit SLT at a position opposing to the common electrode CE. Such pixel electrodes PE are made of, for example, a transparent conductive material such as ITO or IZO. The alignment film AL1 covers the pixel electrodes PE and the insulating film 13.

Meanwhile, the substrate SUB2 includes an insulating substrate 20 having optical transparency such as a glass substrate or a resin substrate. Also, the substrate SUB2 includes a black matrix BM, color filters CFR, CFG and CFB, an overcoat layer OCL and an alignment film AL2 on a side of the insulating substrate 20 opposing to the substrate SUB1.

The black matrix BM is formed on a surface of the insulating substrate 20 on the side of the substrate SUB1, and partitions each pixel. The color filters CFR, CFG and CFB are formed on the surface of the insulating substrate 20 on the side of the substrate SUB1, and part of each of the color filters CFR, CFG and CFB overlaps the black matrix BM when seen in a plan view. The color filter CFR is a red color filter, the color filter CFG is a green color filter, and the color filter CFB is a blue color filter. The overcoat layer OCL covers the color filters CFR, CFG and CFB. The overcoat layer OCL is made of a transparent resin material. The alignment film AL2 covers the overcoat layer OCL.

The optical element OD1 is disposed between the insulating substrate 10 and the backlight unit BL. The optical element OD2 is disposed above the insulating substrate 20, that is, on a side opposite to the substrate SUB1 with the insulating substrate 20 interposed therebetween. The optical element OD1 and the optical element OD2 include at least polarizing plates, and may include retardation plates as needed.

<Self-Capacitive Touch Sensing Method>

Next, a method in which the display device DSP senses a position of an input tool composed of an object such as a finger, that is, an input position by using the sensing electrodes Rx will be described.

The display device DSP can determine input position information based on the change in electrostatic capacitance sensed by the sensing electrodes Rx by using the self-capacitive sensing method. Consequently, it is possible to sense a contact of a finger to a touch sensing surface TDS (see FIG. 3) of the display device DSP or an approach of the finger to the touch sensing surface TDS of the display device DSP. In the first embodiment, the touch sensing surface TDS is a surface of the optical element OD2 and is a surface on a side opposite to the substrate SUB2.

Hereinafter, touch sensing method using the self-capacitive sensing method (self-capacitive touch sensing method) will be described. However, the display device DSP may determine input position information based on the change in electrostatic capacitance sensed by the sensing electrodes Rx by using a mutual-capacitive sensing method.

In the self-capacitive sensing method, the input position information is determined by writing a write signal in each sensing electrode Rx and reading a read signal indicating the change in the electrostatic capacitance caused in each sensing electrode Rx in which the write signal has been written.

Next, a principle of a touch sensing method using the self-capacitive sensing method will be described. The self-capacitive sensing method uses a capacitance Cx1 of the sensing electrode Rx. Further, the self-capacitive sensing method uses a capacitance Cx2 generated from a finger of a user or the like which approaches each sensing electrode Rx.

FIGS. 5 to 8 are views for explaining the self-capacitive sensing method.

Figure 5:
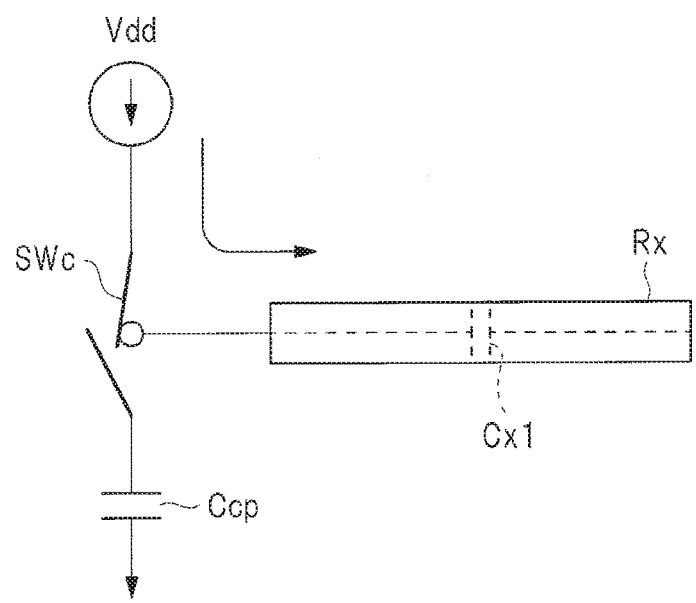
FIG. 5 is a view for explaining a self-capacitive sensing method.
Figure 6:
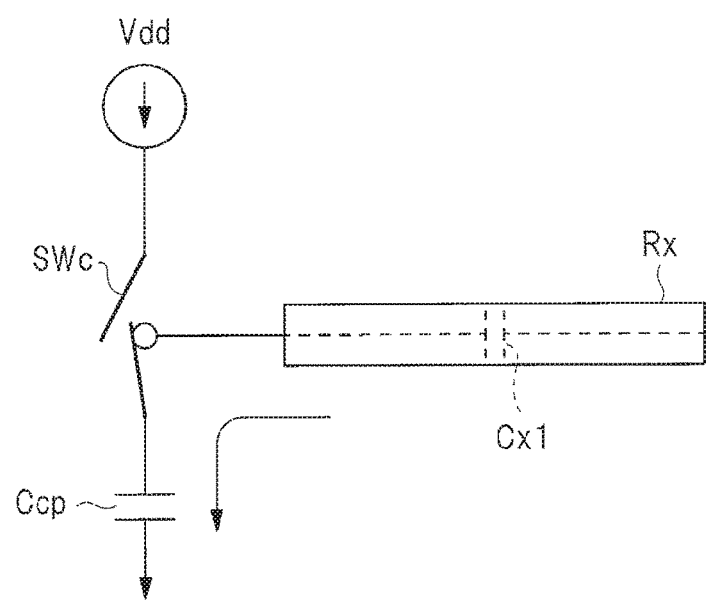
FIG. 6 is a view for explaining the self-capacitive sensing method.

FIGS. 5 and 6 illustrate states where a finger of a user neither touches nor approaches the touch sensing surface of the display device DSP. Hence, electrostatic capacitance coupling does not occur between the sensing electrodes Rx and the finger. FIG. 5 illustrates a state where the sensing electrode Rx is connected to a power source Vdd by a control switch SWc. FIG. 6 illustrates a state where the sensing electrode Rx is disconnected from the power source Vdd by the control switch SWc, and the sensing electrode Rx is connected to a capacitance Ccp serving as a capacitor.

For example, the capacitance Cx1 is charged in the state in FIG. 5, and the capacitance Cx1 is discharged in the state in FIG. 6. Herein, charging the capacitance Cx1 means writing a write signal in each sensing electrode Rx. Further, discharging the capacitance Cx1 means reading a read signal indicating a change in electrostatic capacitance generated in each sensing electrode Rx.

Figure 7:
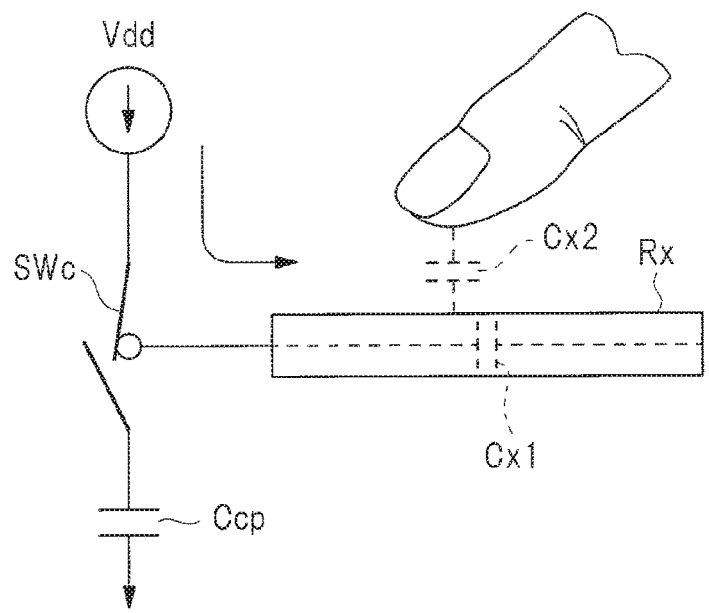
FIG. 7 is a view for explaining the self-capacitive sensing method.
Figure 8:
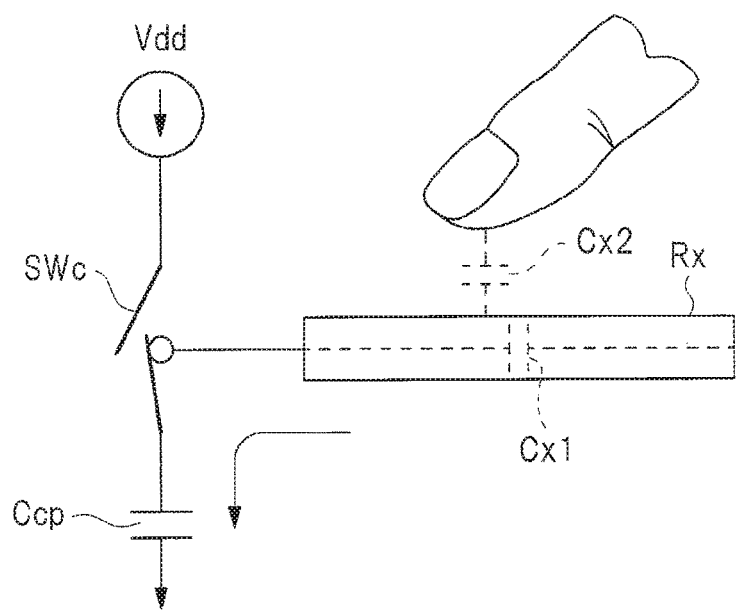
FIG. 8 is a view for explaining the self-capacitive sensing method.

Meanwhile, FIGS. 7 and 8 illustrate states where the finger of the user touches or approaches the touch sensing surface of the display device DSP. Hence, electrostatic capacitance coupling occurs between the sensing electrodes Rx and the finger. FIG. 7 illustrates a state where the sensing electrode Rx is connected to the power source Vdd by the control switch SWc. FIG. 8 illustrates a state where the sensing electrode Rx is disconnected from the power source Vdd by the control switch SWc, and the sensing electrode Rx is connected to the capacitance Ccp.

For example, the capacitance Cx1 is charged in the state in FIG. 7, and the capacitance Cx1 is discharged in the state in FIG. 8.

Herein, time dependency of a voltage of the capacitance Ccp during discharging illustrated in FIG. 8 obviously differs from time dependency of a voltage of the capacitance Ccp during discharging illustrated in FIG. 6 because of the presence of the capacitance Cx2. Hence, in the self-capacitive sensing method, input position information (e.g. presence or absence of operation input) is determined by using a difference in the time dependency of the voltage of the capacitance Ccp caused depending on the presence or absence of the capacitance Cx2.

Figure 9:
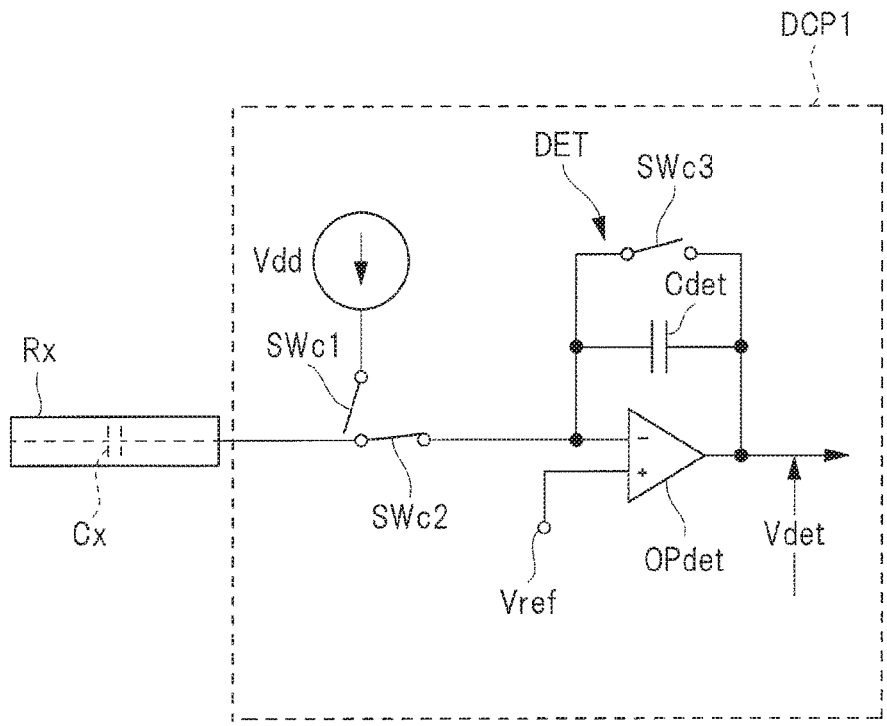
FIG. 9 is a view illustrating an example of a circuit which realizes the self-capacitive sensing method.

Next, an example of a circuit which realizes the self-capacitive sensing method will be described. FIG. 9 is a view illustrating an example of the circuit which realizes the self-capacitive sensing method. Note that FIG. 9 illustrates the capacitance of the sensing electrode Rx as a capacitance Cx.

The circuit which realizes the self-capacitive sensing method illustrated in FIG. 9 is provided in, for example, the sensing unit SE illustrated in FIG. 1. Alternatively, the sensing unit SE may be provided in, for example, the driving IC chip IC1 illustrated in FIG. 1, and the circuit which realizes the self-capacitive sensing method may be provided in the driving IC chip IC1.

As illustrated in FIG. 9, the sensing electrode Rx is switchably connected to the power source Vdd by a switch SWc1. Further, the sensing electrode Rx is switchably connected to a voltage detector DET serving as an integration circuit by a switch SWc2. The voltage detector DET includes, for example, an operational amplifier OPdet, a capacitance Cdet and a switch SWc3. A reference signal Vref is input to the operational amplifier OPdet.

Note that FIG. 9 illustrates a sensing circuit DCP1 included in the sensing unit SE described with reference to FIG. 16.

Figure 10:
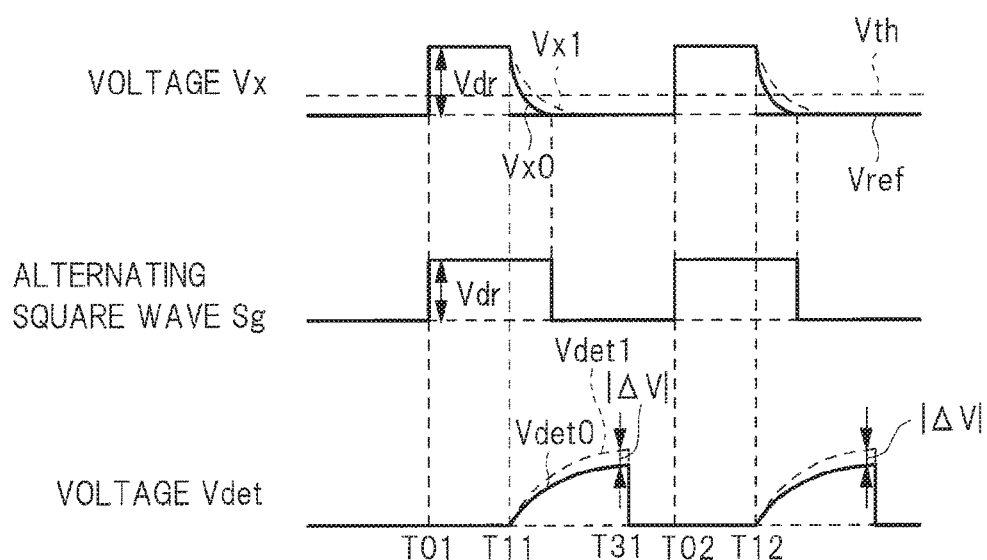
FIG. 10 is a graph schematically illustrating an example of time dependency of an alternating square wave Sg output from a power source, a voltage Vx of a sensing electrode and a voltage Vdet as an output of a voltage detector.

FIG. 10 is a graph schematically illustrating an example of time dependency of an alternating square wave Sg output from the power source, a voltage Vx of a sensing electrode and a voltage Vdet as an output of a voltage detector.

As illustrated in FIG. 10, the power source Vdd outputs the alternating square wave Sg whose cycle is time difference between a time T01 and a time T02 and which has a waveform height of a voltage Vdr. The alternating square wave Sg has a frequency of, for example, approximately several kHz to several hundreds of kHz. The voltage detector DET converts a fluctuation of a current in accordance with the alternating square wave Sg into a fluctuation of a voltage (waveform Vdet0 and waveform Vdet1).

As described above, the sensing electrode Rx is switchably connected to the power source Vdd and the voltage detector DET by the switch SWc1 and the switch SWc2. In FIG. 10, the alternating square wave Sg increases the voltage by the voltage Vdr at a timing of the time T01. At this time, the switch SWc1 is placed in the on state, and the switch SWc2 is placed in the off state. Hence, the voltage Vx of the sensing electrode Rx also rises by the voltage Vdr. Next, the switch SWc1 is placed in the off state before the timing of a time T11. At this time, the sensing electrode Rx is in an electrically floating state, and the rise of the voltage Vx of the sensing electrode Rx by the voltage Vdr is maintained by the capacitance Cx1 of the sensing electrode Rx (see FIG. 5) or a capacitance Cx1+Cx2 (see FIG. 7) obtained by adding the capacitance Cx2 generated by a contact or an approach of the finger to the capacitance Cx1 of the sensing electrode Rx. Further, by placing the switch SWc3 in the on state before the timing of the time T11 and placing the switch SWc3 in the off state after the elapse of a predetermined time, the voltage detector DET is reset. This resetting operation makes the voltage Vdet as an output of the voltage detector DET substantially equal to the reference signal Vref.

Subsequently, when the switch SWc2 is placed in the on state at the timing of the time T11, a voltage input to an inverting input portion of the voltage detector DET becomes equal to the voltage Vx of the sensing electrode Rx. Thereafter, in accordance with a time constant deriving from the capacitance Cx1 of the sensing electrode Rx (or the capacitance Cx1+Cx2) and the capacitance Cdet included in the voltage detector DET, the voltage of the inverting input portion of the voltage detector DET decreases to the reference signal Vref. At this time, since electric charges accumulated in the capacitance Cx1 of the sensing electrode Rx (or the capacitance Cx1+Cx2) move to the capacitance Cdet included in the voltage detector DET, the voltage Vdet of the voltage detector DET rises. When an object such as the finger neither approaches nor contacts the sensing electrode Rx, the voltage Vdet has the waveform Vdet0 indicated by a solid line and is Vdet=Cx1×Vdr/Cdet. When an object such as the finger approaches or contacts and a capacitance generated by an influence of this object is added, the voltage Vdet has the waveform Vdet1 indicated by a broken line and is Vdet=(Cx1+Cx2)×Vdr/Cdet.

Then, at a timing of a time T31 after the electric charges of the capacitance Cx1 of the sensing electrode Rx (or the capacitance Cx1+Cx2) sufficiently move to the capacitance Cdet, the switch SWc2 is placed in the off state and the switch SWc1 and the switch SWc3 are placed in the on state, thereby making the voltage of the sensing electrode Rx equal to a low level of the alternating square wave Sg and resetting the voltage detector DET. At this time, the timing at which the switch SWc1 is placed in the on state may be any timing as long as it is after the switch SWc2 is placed in the off state and before the time T02. Further, the timing at which the voltage detector DET is reset may be any timing as long as it is after the switch SWc2 is placed in the off state and before a time T12. The above operation is repeated at a predetermined frequency (e.g. approximately several kHz to several hundreds of kHz). Then, based on an absolute value |□V| of a difference between the waveform Vdet0 and the waveform Vdet1, the presence or absence of an object which approaches or contacts the touch sensing surface from an outside (presence or absence of touch) can be measured.

When there is neither an approach nor a contact of an object such as the finger, the waveform of the voltage Vx of the sensing electrode Rx has a waveform Vx0 indicated by a solid line. When there is the approach or the contact of an object such as the finger and the capacitance Cx2 generated by an influence of this object is added, the waveform of the voltage Vx of the sensing electrode Rx has the waveform Vx1 indicated by a broken line. By measuring a time in which the waveform Vx0 and the waveform Vx1 decrease to a predetermined threshold voltage Vth, the presence or absence of an object which approaches or contacts the touch sensing surface from an outside (presence or absence of touch) can be measured.

Figure 11:
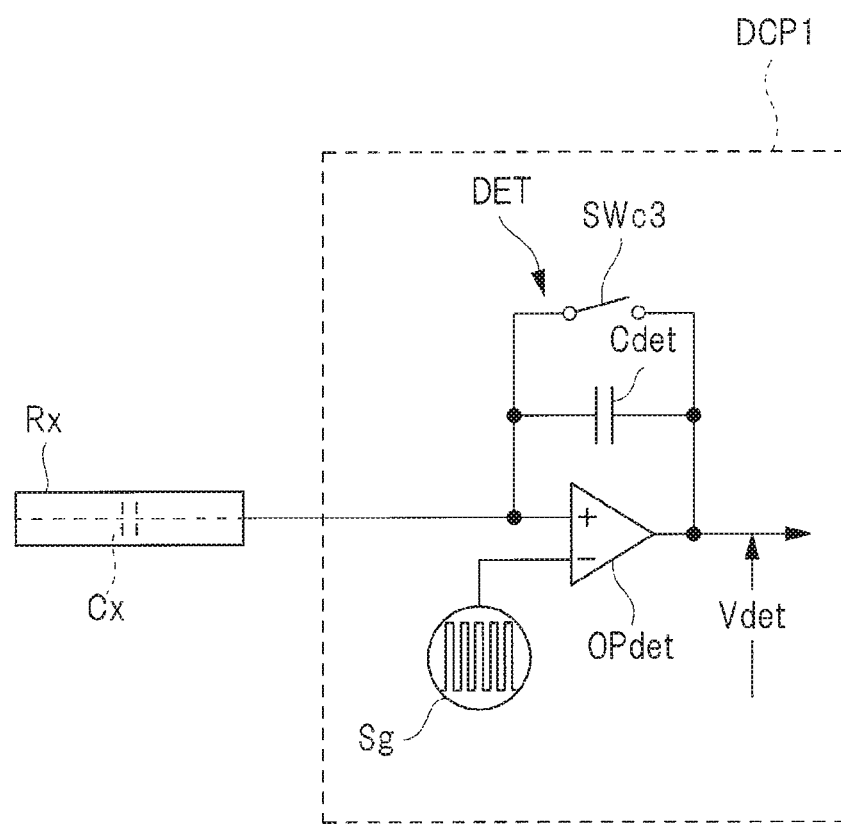
FIG. 11 is a view illustrating another example of a circuit which realizes the self-capacitive sensing method.

Alternatively, another example of the circuit which realizes the self-capacitive sensing method may be used. FIG. 11 is a view illustrating another example of the circuit which realizes the self-capacitive sensing method.

The circuit which realizes the self-capacitive sensing method illustrated in FIG. 11 is provided in, for example, the sensing unit SE illustrated in FIG. 1. Alternatively, the sensing unit SE may be provided in, for example, the driving IC chip IC1 illustrated in FIG. 1, and the circuit which realizes the self-capacitive sensing method may be provided in the driving IC chip IC1.

As illustrated in FIG. 11, the sensing electrode Rx is connected to the voltage detector DET serving as the integration circuit. The voltage detector DET includes, for example, an operational amplifier OPdet, a capacitance Cdet and a switch SWc3. Of the two input terminals of the operational amplifier OPdet, a non-inverting input terminal indicated by "+" is connected to the sensing electrode Rx, and an inverting input terminal indicated by "−" receives an input of the alternating square wave Sg. Further, the inverting input terminal and the non-inverting input terminal of the operational amplifier OPdet are virtually short-circuited, i.e., imaginarily short-circuited. When the sensing electrode Rx is connected to the sensing circuit DCP1, the switch SWc3 is placed in the off state (non-conducted state), and when the sensing electrode Rx is not connected to the sensing circuit DCP1, the switch SWc3 is placed in the on state (conducted state).

Note that FIG. 11 illustrates the sensing circuit DCP1 included in the sensing unit SE described with reference to FIG. 16.

Figure 12:
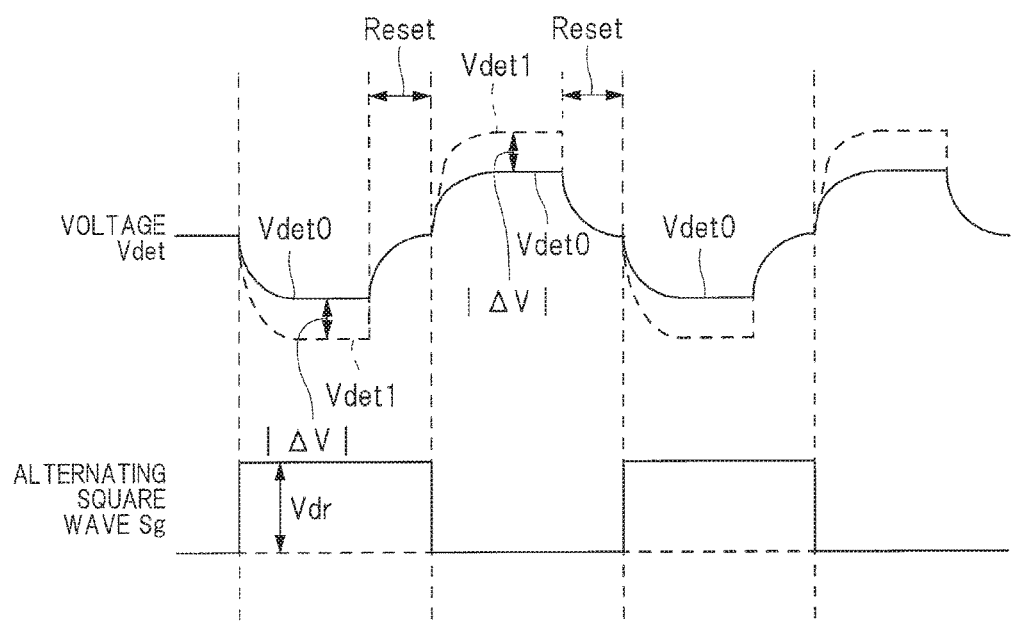
FIG. 12 is a graph schematically illustrating an example of time dependency of the alternating square wave Sg and the voltage Vdet as an output of a voltage detector.

FIG. 12 is a graph schematically illustrating an example of time dependency of the alternating square wave Sg and the voltage Vdet as an output of the voltage detector.

As illustrated in FIG. 12, the alternating square wave Sg has a waveform height of the voltage Vdr. As described above, since the operational amplifier OPdet imaginarily short-circuited, when the alternating square wave Sg is input to the inverting input terminal of the operational amplifier OPdet, a drive signal having the same potential as that of the alternating square wave Sg is applied to the sensing electrode Rx connected to the non-inverting input terminal of the operational amplifier OPdet.

Meanwhile, since the sensing electrode Rx has the capacitance Cx, a voltage of difference is generated between the potential of the sensing electrode Rx and a drive signal, and a current corresponding to the voltage of difference flows between the sensing electrode Rx and the non-inverting input terminal of the operational amplifier OPdet. A value obtained by converting this current into a voltage by the voltage detector DET and integrating the voltage is output as the voltage Vdet having the waveform Vdet0 from the voltage detector DET. The waveform Vdet0 of the voltage Vdet is indicated by a solid line in FIG. 12.

When an object such as the finger approaches or contacts the sensing electrode Rx, the capacitance Cx increases. Therefore, a voltage of difference generated between the potential of the sensing electrode Rx and the drive signal increases, and a current corresponding to the voltage of difference and flowing between the sensing electrode Rx and the non-inverting input terminal of the operational amplifier OPdet increases. Hence, a value obtained by converting this current into a voltage by the voltage detector DET and integrating the voltage increases, and a change in the waveform Vdet1 of the voltage Vdet output from the voltage detector DET increases in comparison with a change in the waveform Vdet0. The waveform Vdet1 is indicated by a broken line in FIG. 12.

Therefore, by comparing the voltage Vdet output from the voltage detector DET with a predetermined threshold voltage, it is possible to sense the presence or absence of the approach or touch of the finger or the like to the sensing electrode Rx. Namely, based on an absolute value |□V| of a difference between the waveform Vdet0 and the waveform Vdet1, the presence or absence of an object which approaches or contacts the touch sensing surface from an outside (presence or absence of touch) can be measured. In order to precisely sense the absolute value |□V|, a period Reset in which charging and discharging of the capacitance Cdet are reset in accordance with the frequency of the alternating square wave Sg by, for example, the switch SWc3 may be provided in the operation of the voltage detector DET.

Unlike the sensing method described with reference to FIGS. 9 and 10, in the sensing method described above with reference to FIGS. 11 and 12, any of the switches SWc1 and SWc2 is not required, and the alternating square wave Sg as a drive signal is directly supplied to the operational amplifier OPdet.

Note that the sensing circuit DCP1 illustrated in FIG. 11 can be used for both of the self-capacitive sensing method and the mutual-capacitive sensing method. When the sensing circuit DCP1 illustrated in FIG. 11 is used for the mutual-capacitive sensing method, it is only necessary to change the connection so that the inverting input terminal of the operational amplifier OPdet is connected to a supply circuit which supplies a reference signal as a fixed potential instead of a supply circuit which supplies the alternating square wave Sg.

Figure 13:
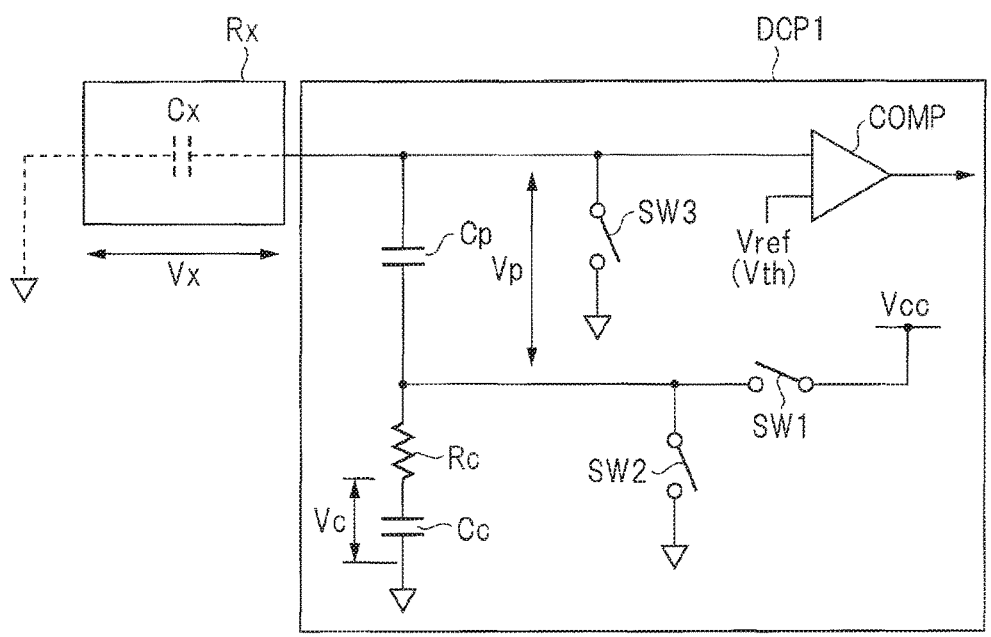
FIG. 13 is a view illustrating still another example of a circuit which realizes the self-capacitive sensing method.

Alternatively, still another example of the circuit which realizes the self-capacitive sensing method may be used. FIG. 13 is a view illustrating still another example of the circuit which realizes the self-capacitive sensing method.

In an example illustrated in FIG. 13, the sensing electrode Rx is connected to one terminal of a voltage dividing capacitance Cp and is connected to one input terminal of a comparator COMP. The sensing electrode Rx has its own capacitance Cx. A supply terminal of the reference signal Vref is connected to the other input terminal of the comparator COMP.

The other terminal of the capacitance Cp is connected to a power source wiring of a voltage Vcc via a switch SW1. Further, the other terminal of the capacitance Cp is connected to one terminal of a capacitance Cc via a resistance Rc. The other terminal of the capacitance Cc is connected to a reference potential (e.g. earth potential).

A switch SW2 is connected between the other terminal of the capacitance Cp and the reference potential, and a switch SW3 is connected between the one terminal of the capacitance Cp and the reference potential. The switches SW1, SW2 and SW3 and the comparator COMP are provided in, for example, the sensing unit SE illustrated in FIG. 1.

Note that FIG. 13 illustrates the sensing circuit DCP1 included in the sensing unit SE described with reference to FIG. 16.

In the example illustrated in FIG. 13, the switch SW1 is placed in the on state (conducted state) at a certain cycle, and the capacitance Cc can be charged in this on state. When the capacitance Cc is charged, the switches SW2 and SW3 are placed in the off state. When the capacitance Cc has been charged, all of the switches SW1, SW2 and SW3 are placed in the off state, and electric charge of the capacitance Cc is maintained.

Next, the switches SW2 and SW3 are placed in the on state for a certain period while maintaining the off state of the switch SW1. Then, almost all electric charges of the capacitances Cp and Cx are discharged, and part of the electric charge of the capacitance Cc is discharged via the resistance Rc.

Next, all of the switches SW1, SW2 and SW3 are placed in the off state. Then, the electric charge of the capacitance Cc moves to the capacitances Cp and Cx. Then, the voltage Vx of the capacitance Cx is compared with the reference signal Vref or the threshold voltage Vth by the comparator COMP.

The voltage of the capacitance Cc is defined as a voltage Vc, and the voltage of the capacitance Cp is defined as a voltage Vp. At this time, the voltage Vx is equal to a sum of the voltage Vc and the voltage Vp, and characteristics of a change in the voltage Vc or the degree of conversion change in accordance with a total value of the capacitance Cp and the capacitance Cx. The change in the capacitance Cx affects the voltage Vx of the capacitance Cx. Further, a value of the capacitance Cx differs in accordance with the degree of an approach of the finger of the user to the sensing electrode Rx.

Hence, when the finger is distant from the sensing electrode Rx, time dependency of the voltage Vc has characteristics of changing slowly, and when the finger is close to the sensing electrode Rx, time dependency of the voltage Vc has characteristics of changing quickly.

The comparator COMP compares the voltage Vx with the reference signal Vref or the threshold voltage Vth in synchronization with repetition of the on state and the off state of the switches SW2 and SW3. Then, in the case of Vx>Vref, the comparator COMP obtains an output pulse. However, the comparator COMP stops an output pulse in the case of Vx<Vref.

At this time, a period in which the output pulse of the comparator COMP is obtained may be measured, and the number of output pulses of the comparator COMP (the number of pulses until Vx<Vref holds after the capacitance Cc is charged) may be measured.

As described above, also by the method described with reference to FIG. 13, the degree of an approach or a contact of the finger to the sensing surface can be measured based on a state of the output pulse of the comparator COMP.

<Touch Sensing Method and Touch Sensing Circuit>

Next, the touch sensing method and the touch sensing circuit of the display device according to the first embodiment will be described.

Figure 14:
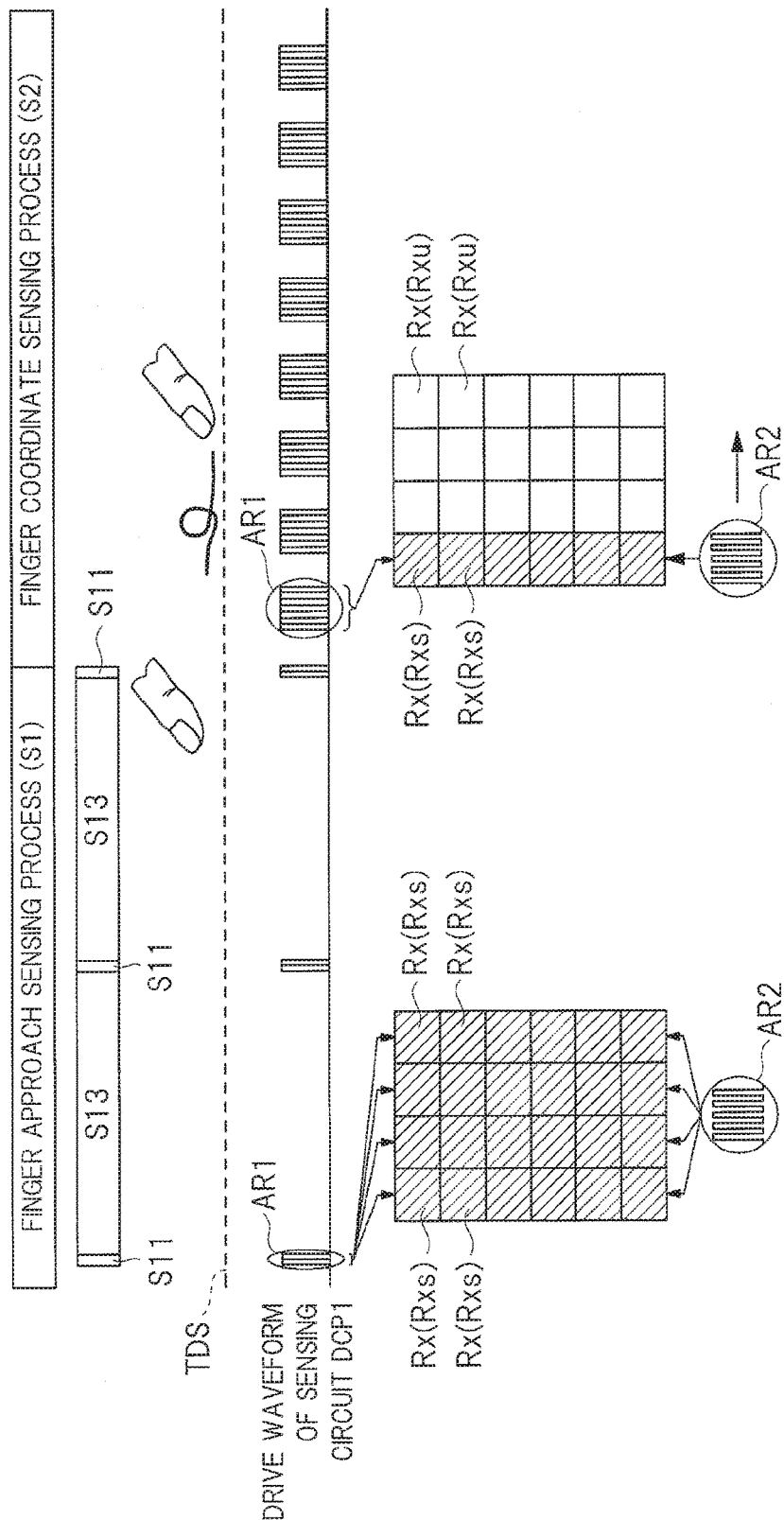
FIG. 14 is a view for explaining a touch sensing method of the display device according to the first embodiment.
Figure 15:
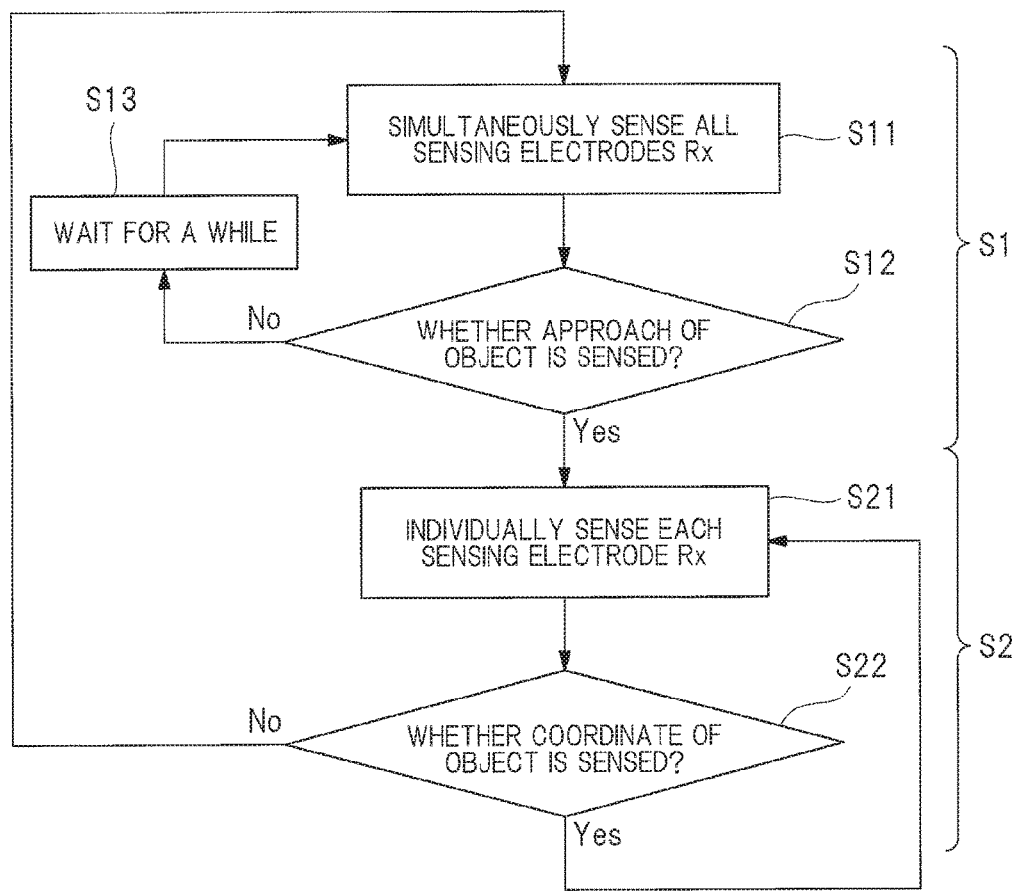
FIG. 15 is a flowchart for explaining the touch sensing method of the display device according to the first embodiment.

First, the touch sensing method of the display device according to the first embodiment will be described. FIG. 14 is a view for explaining the touch sensing method of the display device according to the first embodiment. FIG. 15 is a flowchart for explaining the touch sensing method of the display device according to the first embodiment. Note that areas AR1 which are hatched portions in FIG. 14 are portions in which a drive signal having a square wave is supplied from the sensing circuit DCP1 as shown by areas AR2 illustrating the areas AR1 in an enlarged manner.

The display device according to the first embodiment includes the sensing unit SE (see FIG. 1) having a touch sensing function. Further, as illustrated in FIGS. 14 and 15, the sensing unit SE of the display device according to the first embodiment performs a step S1 as a finger approach sensing process in which an approach or a contact of the finger is sensed and a step S2 as a finger coordinate sensing process in which a coordinate of the approaching or contacting finger is sensed.

Herein, when the step S1 as the finger approach sensing process is referred to as a standby mode and the step S2 as the finger coordinate sensing process is referred to as a sensing mode, the sensing unit SE performs the finger approach sensing process as the standby mode before the finger coordinate sensing process as the sensing mode.

In the step S1, first, the sensing unit SE simultaneously senses all sensing electrodes Rx (step S11 in FIG. 15). In this step S11, the sensing unit SE selects all of the plurality of sensing electrodes Rx as a plurality of sensing process electrodes and collectively senses a change in electrostatic capacitance of each of the plurality of selected sensing process electrodes, thereby sensing an approach or a contact of an object such as the finger to the touch sensing surface TDS. Namely, the step S11 is a collective sensing process in which the change in the electrostatic capacitance of each of the plurality of sensing electrodes Rx is collectively sensed.

In the step S1, the sensing unit SE next determines whether or not the approach of the object has been sensed (step S12 in FIG. 15). In this step S12, the sensing unit SE determines whether or not the approach or the contact of an object such as the finger to the touch sensing surface TDS has been sensed. When it is determined in the step S12 that the approach or the contact of an object such as the finger has not been sensed, the sensing unit SE waits for a while (step S13 in FIG. 15). Then, after the sensing unit SE waits for a while in the step S13, it repeats the step S11 again. Meanwhile, when it is determined in the step S12 that the approach or the contact of an object such as the finger has been sensed, the sensing unit SE performs the step S2.

In the step S2, first, the sensing unit SE individually senses each sensing electrode Rx (step S21 in FIG. 15). In this step S21, the sensing unit SE senses a position, i.e., a coordinate of an object such as the finger on the touch sensing surface TDS by individually sensing a change in electrostatic capacitance of each of the plurality of sensing electrodes Rx instead of collectively sensing the change in electrostatic capacitance. Namely, the step S21 is an individual sensing process in which the change in the electrostatic capacitance of each of the plurality of sensing electrodes Rx is individually sensed.

In the step S2, the sensing unit SE next determines whether or not the coordinate of the object has been sensed (step S22 in FIG. 15). In this step S22, the sensing unit SE determines whether or not the coordinate of an object such as the finger on the touch sensing surface TDS has been sensed. When the coordinate of an object such as the finger has been sensed in the step S22, the sensing unit SE repeats the step S21 again. Meanwhile, when the coordinate of an object such as the finger has not been sensed in the step S22, the sensing unit SE performs the step S1, i.e., the step S11 again.

Note that FIG. 14 illustrates the case where all of the plurality of sensing electrodes Rx are selected as a plurality of sensing process electrodes and the change in electrostatic capacitance of each of the plurality of selected sensing process electrodes is collectively sensed in the step S11. However, as described later with reference to FIGS. 24 and 25, part of the plurality of sensing electrodes Rx may be selected as the plurality of sensing process electrodes and the change in the electrostatic capacitance of each of the plurality of selected sensing process electrodes may be collectively sensed.

Next, the touch sensing circuit of the display device according to the first embodiment will be described with reference to FIG. 16. FIG. 16 is a view illustrating the touch sensing circuit of the display device according to the first embodiment. In FIG. 16, all of the plurality of sensing electrodes Rx are hatched to show that all of the plurality of sensing electrodes Rx are selected in the step S11.

Figure 16:
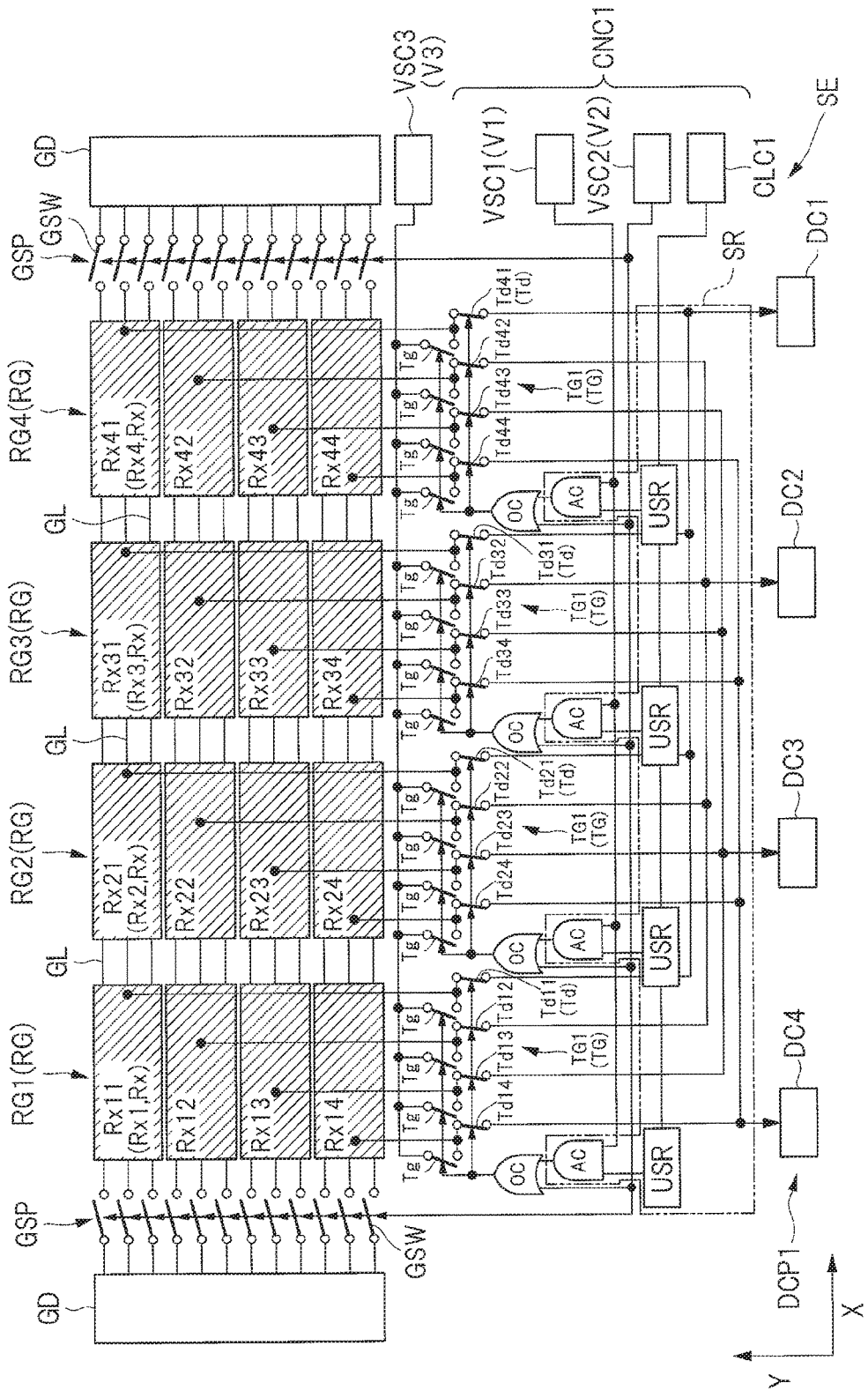
FIG. 16 is a view illustrating a touch sensing circuit of the display device according to the first embodiment.

As illustrated in FIG. 16, the sensing unit SE as the touch sensing circuit includes the sensing circuit DCP1 and a connection circuit CNC1. The sensing circuit DCP1 senses the change in electrostatic capacitance of each of the plurality of sensing electrodes Rx. The connection circuit CNC1 switchably connects each of the plurality of sensing electrodes Rx to the sensing circuit DCP1.

Electrode groups formed of a plurality of sensing electrodes Rx arranged in the Y axis direction when seen in a plan view are referred to as electrode groups RG. At this time, the display device includes a plurality of electrode groups RG. The plurality of electrode groups RG are arranged in the X axis direction when seen in a plan view, and each of the plurality of electrode groups RG includes a plurality of sensing electrodes Rx arranged in the Y axis direction when seen in a plan view.

In the example illustrated in FIG. 16, an electrode group RG1 including sensing electrodes Rx11, Rx12, Rx13 and Rx14 and an electrode group RG2 including sensing electrodes Rx21, Rx22, Rx23 and Rx24 are provided as the electrode groups RG. Further, an electrode group RG3 including sensing electrodes Rx31, Rx32, Rx33 and Rx34 and an electrode group RG4 including sensing electrodes Rx41, Rx42, Rx43 and Rx44 are provided as the electrode groups RG. Namely, the electrode group RG1 includes a plurality of sensing electrodes Rx1, the electrode group RG2 includes a plurality of sensing electrodes Rx2, the electrode group RG3 includes a plurality of sensing electrodes Rx3, and the electrode group RG4 includes a plurality of sensing electrodes Rx4.

Preferably, the connection circuit CNC1 includes a plurality of transistor groups TG which connect each of the plurality of electrode groups RG to the sensing circuit DCP1. Each of the plurality of transistor groups TG includes a plurality of transistors Td. Each of the plurality of transistors Td is a field effect transistor serving as a switching element, and each of the plurality of transistors Td includes a gate electrode. In each pair of the electrode groups RG and the transistor groups TG, the plurality of transistors Td included in the transistor group TG connect each of the plurality of sensing electrodes Rx included in the electrode group RG to the sensing circuit DCP1.

In the example illustrated in FIG. 16, the sensing unit SE includes sensing circuits DC1, DC2, DC3 and DC4 as the sensing circuit DCP1. Further, in the example illustrated in FIG. 16, the connection circuit CNC1 includes transistors Td11, Td12, Td13 and Td14 included in a transistor group TG1 and transistors Td21, Td22, Td23 and Td24 included in a transistor group TG2 as the transistors Td. Furthermore, the connection circuit CNC1 includes transistors Td31, Td32, Td33 and Td34 included in a transistor group TG3 and transistors Td41, Td42, Td43 and Td44 included in a transistor group TG4 as the transistors Td.

The transistor Td11 connects the sensing electrode Rx11 to the sensing circuit DC1, the transistor Td12 connects the sensing electrode Rx12 to the sensing circuit DC2, the transistor Td13 connects the sensing electrode Rx13 to the sensing circuit DC3, and the transistor Td14 connects the sensing electrode Rx14 to the sensing circuit DC4. The transistor Td21 connects the sensing electrode Rx21 to the sensing circuit DC1, the transistor Td22 connects the sensing electrode Rx22 to the sensing circuit DC2, the transistor Td23 connects the sensing electrode Rx23 to the sensing circuit DC3, and the transistor Td24 connects the sensing electrode Rx24 to the sensing circuit DC4.

The transistor Td31 connects the sensing electrode Rx31 to the sensing circuit DC1, the transistor Td32 connects the sensing electrode Rx32 to the sensing circuit DC2, the transistor Td33 connects the sensing electrode Rx33 to the sensing circuit DC3, and the transistor Td34 connects the sensing electrode Rx34 to the sensing circuit DC4. The transistor Td41 connects the sensing electrode Rx41 to the sensing circuit DC1, the transistor Td42 connects the sensing electrode Rx42 to the sensing circuit DC2, the transistor Td43 connects the sensing electrode Rx43 to the sensing circuit DC3, and the transistor Td44 connects the sensing electrode Rx44 to the sensing circuit DC4.

Further, preferably, the connection circuit CNC1 includes voltage supply circuits VSC1 and VSC2, a clock signal supply circuit CLC1 and a plurality of unit register circuits USR.

The voltage supply circuit VSC1 supplies a voltage V1 which is a gate voltage of the transistor Td. The transistor Td is in the on state when the voltage V1 is input to the gate electrode.

The voltage supply circuit VSC2 supplies the voltage V2 which is a gate voltage of the transistor Td to each of the plurality of transistor groups TG. Namely, the voltage supply circuit VSC2 supplies the voltage V2 to the gate electrode of each of the plurality of transistors Td included in each of the plurality of transistor groups TG. The transistor Td is in the on state when the voltage V2 is input to the gate electrode.

The plurality of unit register circuits USR supply the voltage V1 which is a gate voltage of the transistor Td to each of the plurality of transistor groups TG. Further, the plurality of unit register circuits USR form a shift register circuit SR. Furthermore, the shift register circuit SR sequentially switches and supplies the voltage V1 from the voltage supply circuit VSC1 via each of the plurality of unit register circuits USR based on a start pulse or a clock signal from the clock signal supply circuit CLC1. Namely, the shift register circuit SR sequentially switches and supplies the voltage V1 from the voltage supply circuit VSC1 to each of the plurality of transistor groups TG based on the clock signal from the clock signal supply circuit CLC1.

Note that various circuits such as a multiplexer circuit and a decoder circuit can be used instead of the shift register circuit.

In the first embodiment, preferably, the connection circuit CNC1 includes a plurality of OR circuits OC. An output of the voltage supply circuit VSC2 and an output of each of the plurality of unit register circuits USR are input to each of the plurality of OR circuits OC, and each of the plurality of OR circuits OC calculates an OR of the output of the voltage supply circuit VSC2 and the output of each of the plurality of unit register circuits USR. In each set of the transistor groups TG, the unit register circuits USR and the OR circuits OC, the output of the OR circuit OC is input to the gate electrode of each of the plurality of transistors Td included in the transistor group TG.

Note that the shift register circuit SR may include a plurality of AND circuits AC. An output of the voltage supply circuit VSC1 and an output of each of the plurality of unit register circuits USR are input to each of the plurality of AND circuits AC, and each of the plurality of AND circuits AC calculates an AND of the output of the voltage supply circuit VSC1 and the output of each of the plurality of unit register circuits USR. In each set of the unit register circuits USR, the OR circuits OC and the AND circuits AC, the output of the AND circuit AC is input to the OR circuit OC as the output of the voltage supply circuit VSC1.

The sensing unit SE supplies the voltage V2 from the voltage supply circuit VSC2 in the step S11 included in the step S1 as the finger approach sensing process. As described above, the transistor Td is in the on state when the voltage V2 is input to the gate electrode. Hence, by supplying the voltage V2 from the voltage supply circuit VSC2, the voltage V2 which is an OR of the output of the voltage supply circuit VSC2 and the output of each of the plurality of unit register circuits USR is input to the gate electrode of each of the plurality of transistors Td included in each of the plurality of transistor groups TG.

Consequently, each of the plurality of transistors Td included in each of the plurality of transistor groups TG is placed in the on state, and the plurality of sensing electrodes Rx included in each of the plurality of electrode groups RG are connected to the sensing circuit DCP1 by each of the plurality of transistors Td included in each of the plurality of transistor groups TG. Namely, the sensing unit SE selects the plurality of sensing electrodes Rx included in each of the plurality of electrode groups RG as the plurality of sensing process electrodes and connects each of the plurality of selected sensing process electrodes to the sensing circuit DCP1 by the connection circuit CNC1, thereby collectively sensing the electrostatic capacitance of each of the plurality of selected sensing process electrodes.

Herein, the selected sensing process electrodes are referred to as selected sensing electrodes Rxs (see FIG. 14). In the example illustrated in FIG. 16, the sensing unit SE selects all of the plurality of sensing electrodes Rx included in all of the plurality of electrode groups RG as the plurality of sensing process electrodes.

Meanwhile, the sensing unit SE does not supply the voltage V2 from the voltage supply circuit VSC2 in the step S21 included in the step S2 as the finger coordinate sensing process. Then, the sensing unit SE selects one transistor group TG of the plurality of transistor groups TG, and supplies the voltage V1 from the voltage supply circuit VSC1 to the gate electrode of each of the plurality of transistors Td included in the selected transistor group TG via the selected unit register circuit USR. As described above, the transistor Td is in the on state when the voltage V1 is input to the gate electrode. Hence, by supplying the voltage V1 from the unit register circuit USR, the voltage V1 which is an OR of the output of the voltage supply circuit VSC2 and the output of the selected unit register circuit USR is input to the gate electrode of each of the plurality of transistors Td included in the selected transistor groups TG.

Consequently, each of the plurality of transistors Td included in the selected transistor group TG is placed in the on state, and the plurality of sensing electrodes Rx included in any of the plurality of electrode groups RG are connected to the sensing circuit DCP1 by each of the plurality of transistors Td included in the selected transistor group TG.

As described above, the shift register circuit SR sequentially switches and supplies the voltage V1 from the voltage supply circuit VSC1 to each of the plurality of transistor groups TG. Hence, in the step S21, the sensing unit SE individually senses the electrostatic capacitance of each of the plurality of sensing electrodes Rx by sequentially switching and connecting the plurality of sensing electrodes Rx one by one or in units of several sensing electrodes Rx by the connection circuit CNC1 to the sensing circuit DCP1.

Meanwhile, the sensing unit SE includes a guard signal supply circuit VSC3. Further, the sensing unit SE includes a plurality of transistors Tg as field effect transistors. The guard signal supply circuit VSC3 supplies a signal V3, which is a guard signal for preventing the change in the electrostatic capacitance of the selected sensing electrodes Rx from being affected by the non-selected sensing electrodes Rx, to the non-selected sensing electrodes Rx. Each of the plurality of transistors Tg connects the plurality of sensing electrodes Rx included in each of the plurality of electrode groups RG to the guard signal supply circuit VSC3.

In the step S2 as the finger coordinate sensing process, the sensing unit SE supplies the signal V3 as the guard signal from the guard signal supply circuit VSC3 to the sensing electrodes Rx which are not selected as the sensing process electrodes, i.e., the non-selected sensing electrodes Rxu (see FIG. 14). For example, a signal having the same phase as that of a drive signal supplied from the sensing circuit DCP1 to the selected sensing electrode Rxs can be used as the guard signal.

As described above, the sensing unit SE does not supply the voltage V2 from the voltage supply circuit VSC2 in the step S21. Further, in the step S21, the sensing unit SE does not supply the voltage V1 from the voltage supply circuit VSC1, either, to the gate electrode of each of the plurality of transistors Tg connected to each of the plurality of non-selected sensing electrodes Rx. Furthermore, the transistor Tg is in the on state when any one of the voltage V1 and the voltage V2 is not input to the gate electrode.

Thus, each of the plurality of transistors Tg connected to each of the plurality of non-selected sensing electrodes Rx is placed in the on state, and the signal V3 as the guard signal is supplied to the non-selected sensing electrodes Rx. Therefore, it is possible to prevent the change in the electrostatic capacitance of the selected sensing electrodes Rx from being affected by the non-selected sensing electrodes Rx.

In addition, as described above, the sensing unit SE supplies the voltage V2 from the voltage supply circuit VSC2 in the step S11. At this time, the voltage V2 which is the OR of the output of the voltage supply circuit VSC2 and the output of each of the plurality of unit register circuits USR is input to the gate electrode of each of the plurality of transistors Tg. Thus, since the on voltage is not applied to any of the plurality of transistors Tg, all of the plurality of transistors Tg are placed in the off state.

The display device DSP includes the plurality of scanning lines GL, the scanning line drive circuit GD and the switching unit GSP. The plurality of scanning lines GL overlap the plurality of electrode groups RG, i.e., the plurality of sensing electrodes Rx when seen in a plan view. The scanning line drive circuit GD is a scanning signal output circuit which outputs scanning signals input to the plurality of scanning lines GL. The switching unit GSP switches a connection state of the scanning line drive circuit GD and the plurality of scanning lines GL. The switching unit GSP includes a plurality of switching elements GSW serving as field effect transistors. The plurality of switching elements GSW connect each of the plurality of scanning lines GL to the scanning line drive circuit GD. Each of the plurality of switching elements GSW includes a gate electrode, and the output of the voltage supply circuit VSC2 is input to the gate electrode of each of the plurality of switching elements GSW. The switching elements GSW are in the off state when the voltage V2 is input to the gate electrode.

When the display device DSP includes the switching unit GSP, the sensing unit SE supplies the voltage V2 from the voltage supply circuit VSC2 to the gate electrode of each of the plurality of switching elements GSW, and performs the step S11 in the state where the plurality of scanning lines GL are electrically floating. Consequently, it is possible to reduce parasitic capacitance included via the scanning lines GL among the parasitic capacitance of each of the plurality of sensing electrodes Rx. Accordingly, it is possible to improve the sensing precision for performing the step S11 and to reduce power consumption for performing the step S11.

In addition, when the scanning line drive circuits GD are provided at both ends of each of the plurality of scanning lines GL as illustrated in FIG. 16, the switching units GSP may be provided at both ends of each of the plurality of scanning lines GL in order to electrically float each of the plurality of scanning lines GL.

Further, instead of the scanning line drive circuit GD, the switching unit GSP may switch a connection state of the signal line drive circuit SD and the plurality of signal lines SL. In this case, the sensing unit SE may supply the voltage V2 from the voltage supply circuit VSC2 to the gate electrode of each of the plurality of switching elements GSW, and perform the step S11 in the state where the plurality of signal lines SL are electrically floating. Consequently, it is possible to reduce parasitic capacitance included via the signal lines SL among the parasitic capacitance of each of the plurality of sensing electrodes Rx. Accordingly, it is possible to improve sensing precision for performing the step S11 and to reduce power consumption for performing the step S11.

Figure 17:
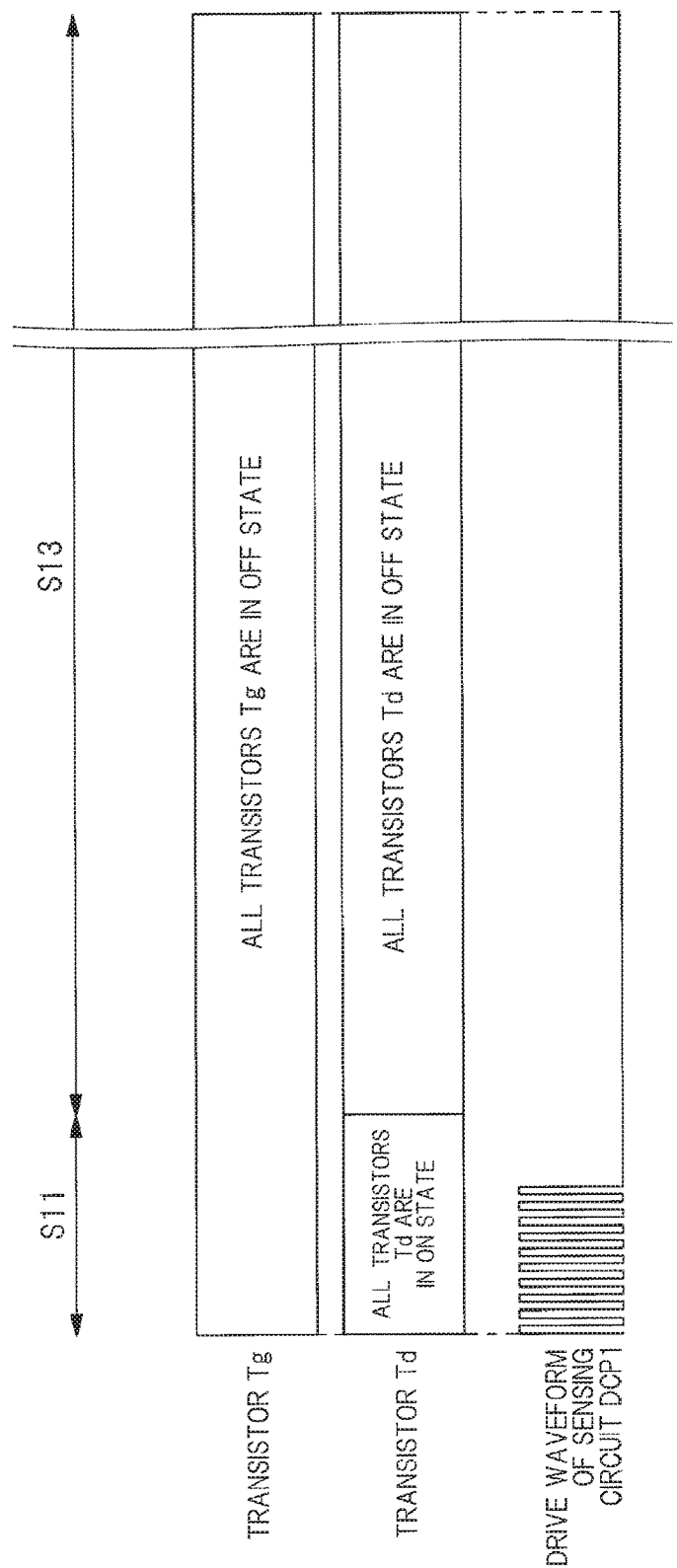
FIG. 17 is a timing chart for explaining a finger approach sensing process of the touch sensing process of the display device according to the first embodiment.
Figure 18:
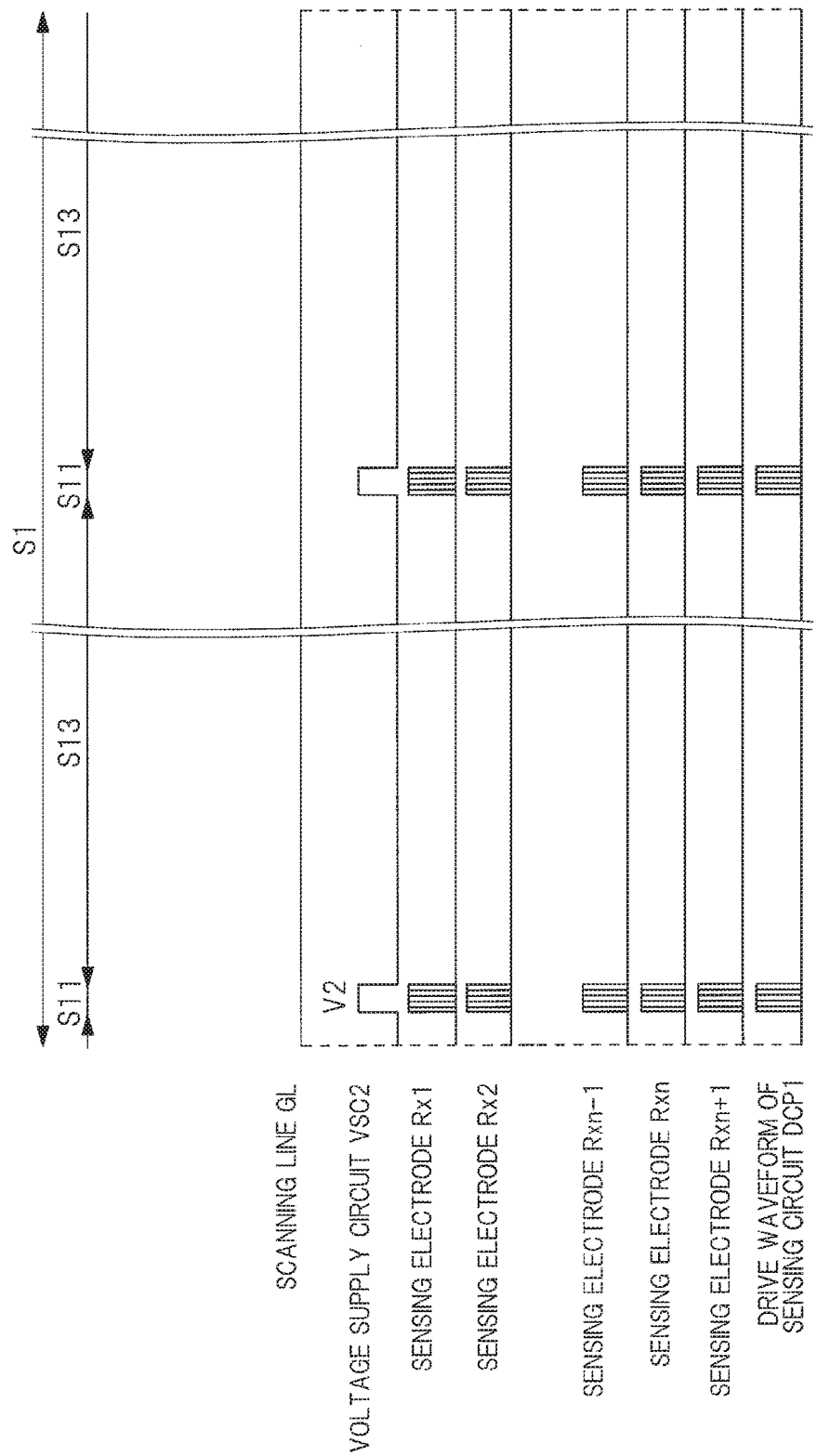
FIG. 18 is a timing chart for explaining the finger approach sensing process of the touch sensing process of the display device according to the first embodiment.

Next, a timing chart of the touch sensing process of the display device according to the first embodiment will be described with reference to FIGS. 17 and 18. FIGS. 17 and 18 are timing charts for explaining the finger approach sensing process of the touch sensing process of the display device according to the first embodiment. FIG. 17 illustrates the timing chart in the case where the step S11 and the step S13 are each performed once, and FIG. 18 illustrates the timing chart in the case where the step S11 and the step S13 are each performed twice. FIG. 17 schematically illustrates a state of the transistors Tg, a state of the transistors Td and a drive waveform of the sensing circuit DCP1. FIG. 18 schematically illustrates the voltage of the scanning line GL, an output of the voltage supply circuit VSC2, sensing waveforms of sensing electrodes Rx1, Rx2, Rxn−1, Rxn and Rxn+1 included in the electrode groups RG in a first row, a second row, an n−1th row, an nth row and an n+1th row (see FIG. 16) when n is an integer of 2 or more, and a drive waveform of the sensing circuit DCP1. Note that hatched portions in FIG. 18 are portions in which a signal having a square wave is sensed or is applied like the areas AR2 illustrating the areas AR1 in an enlarged manner in FIG. 14.

As illustrated in FIG. 17, all of the plurality of transistors Tg are placed in the off state in the step S11. Further, all of the plurality of transistors Td are placed in the on state in the step S11.

As illustrated in FIG. 18, in the step S11, each of the plurality of scanning lines GL is electrically floating and no signal is input to each of the plurality of scanning lines GL. Further, in the step S11, the voltage V2 is supplied from the voltage supply circuit VSC2, and a drive waveform is supplied from the sensing circuit DCP1. Then, the sensing waveforms of the sensing electrodes Rx1, Rx2, Rxn−1, Rxn and Rxn+1 are collectively sensed.

Meanwhile, as illustrated in FIG. 17, in the step S13, while the off state of all of the plurality of transistors Tg is maintained, all of the plurality of transistors Td are placed in the off state. Further, as illustrated in FIG. 18, in the step S13, the voltage V2 is not supplied from the voltage supply circuit VSC2, and a drive waveform is not supplied from the sensing circuit DCP1. Furthermore, the sensing waveforms of the sensing electrodes Rx1, Rx2, Rxn−1, Rxn and Rxn+1 are not sensed.

Namely, in the step S11, the sensing unit SE selects all of the plurality of electrode groups RG as the plurality of sensing process electrode groups, and selects the plurality of sensing electrodes Rx included in each of the plurality of selected sensing process electrode groups as the plurality of sensing process electrodes. Further, in the step S11, the sensing unit SE collectively senses the electrostatic capacitance of each of the plurality of selected sensing process electrodes by connecting each of the plurality of selected sensing process electrodes to the sensing circuit DCP1 by the connection circuit CNC1. Meanwhile, in the step S13, the sensing unit SE does not connect any one of the plurality of sensing electrodes Rx included in all of the plurality of electrode groups RG to the sensing circuit DCP1, and does not sense the change in the electrostatic capacitance of any of the plurality of sensing electrodes Rx included in all of the plurality of electrode groups RG.

As described above, in the first embodiment, the sensing unit SE collectively senses the change in electrostatic capacitance of all of the plurality of sensing electrodes Rx included in all of the plurality of electrode groups RG in the step S11. Consequently, it is possible to shorten a sensing time and reduce power consumption. Further, by performing the step S11 in the state where each of the plurality of scanning lines GL is electrically floating, it is possible to improve sensing precision for performing the step S11 and to reduce power consumption for performing the step S11.

<Touch Sensing Method and Touch Sensing Circuit of Comparative Example>

Next, the touch sensing method and the touch sensing circuit according to the comparative example will be described, and problems of the touch sensing method and the touch sensing circuit according to the comparative example will be described.

Figure 19:
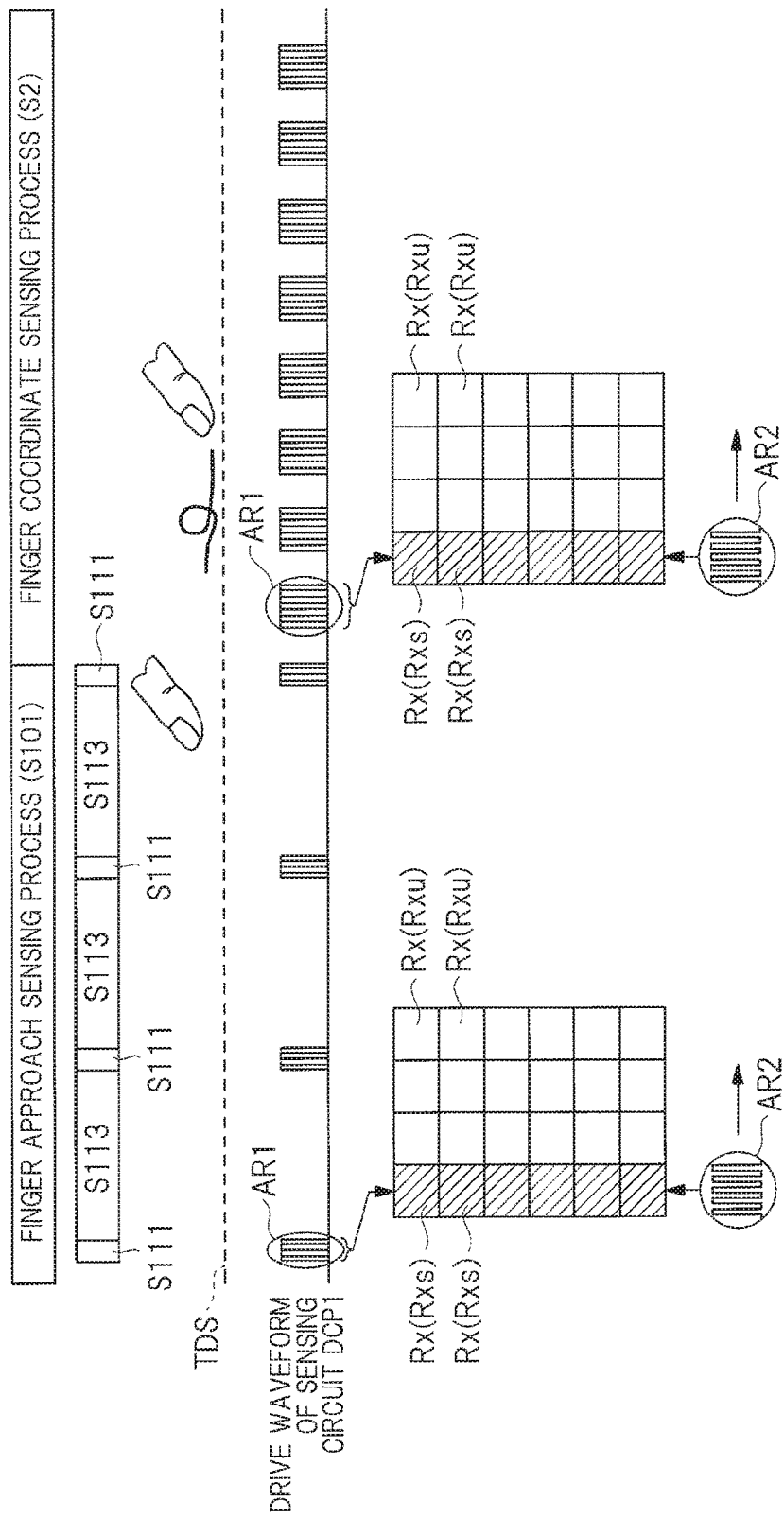
FIG. 19 is a view for explaining a touch sensing method of a display device according to a comparative example.

First, the touch sensing method of the display device according to the comparative example will be described. FIG. 19 is a view for explaining the touch sensing method of the display device according to the comparative example FIG. 20 is a flowchart for explaining the touch sensing method of the display device according to the comparative example Note that areas AR1 which are hatched portions in FIG. 19 are portions in which a drive signal having a square wave is supplied from the sensing circuit DCP1 as shown by the areas AR2 illustrating the areas AR1 in an enlarged manner.

Figure 20:
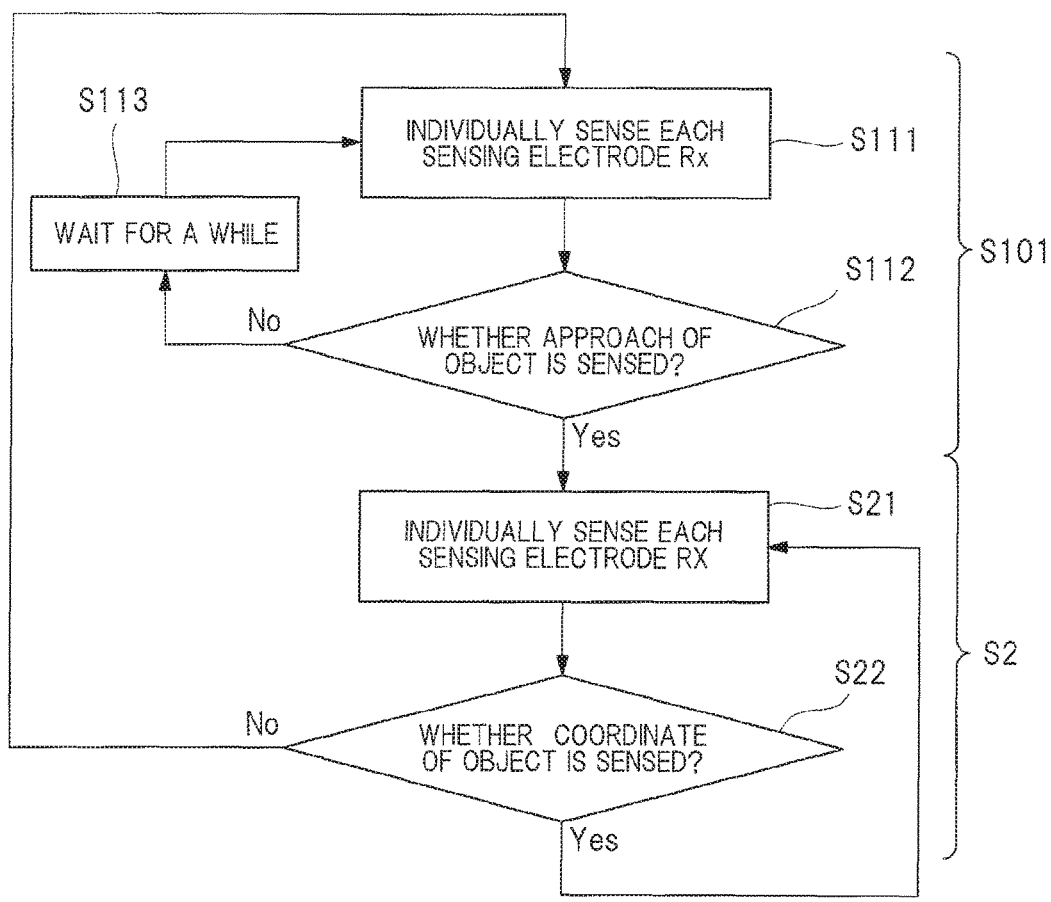
FIG. 20 is a flowchart for explaining the touch sensing method of the display device according to the comparative example.

As illustrated in FIGS. 19 and 20, the sensing unit SE of the display device according to the comparative example performs a step S101 as a finger approach sensing process in which an approach or a contact of the finger is sensed and a step S2 as a finger coordinate sensing process in which a coordinate of the approaching or contacting finger is sensed.

Herein, when the step S101 as the finger approach sensing process is referred to as a standby mode and the step S2 as the finger coordinate sensing process is referred to as a sensing mode, the sensing unit SE performs the finger approach sensing process as the standby mode before the finger coordinate sensing process as the sensing mode also in the comparative example.

In the step S101, first, the sensing unit SE individually senses each sensing electrode Rx (step S111 in FIG. 20). In this step S111, unlike the step S11 in FIG. 15, the sensing unit SE senses an approach or a contact of an object such as a finger to a touch sensing surface TDS by individually sensing a change in electrostatic capacitance of each of the plurality of sensing electrodes Rx instead of collectively sensing the change in the electrostatic capacitance of each of the plurality of sensing electrodes Rx.

In the step S101, the sensing unit SE next determines whether or not the approach of an object has been sensed (step S112 in FIG. 20). In this step S112, the sensing unit SE determines whether or not the approach or the contact of an object to the touch sensing surface TDS has been sensed. When it is determined in the step S112 that the approach or the contact of an object such as the finger has not been sensed, the sensing unit SE waits for a while (step S113 in FIG. 20). Then, after the sensing unit SE waits for a while in the step S113, it repeats the step S111 again. Meanwhile, when it is determined in the step S112 that the approach or the contact of an object such as the finger has been sensed, the sensing unit SE performs the step S2.

The step S2 can be performed in the same manner as the step S2 in FIG. 15.

Figure 21:
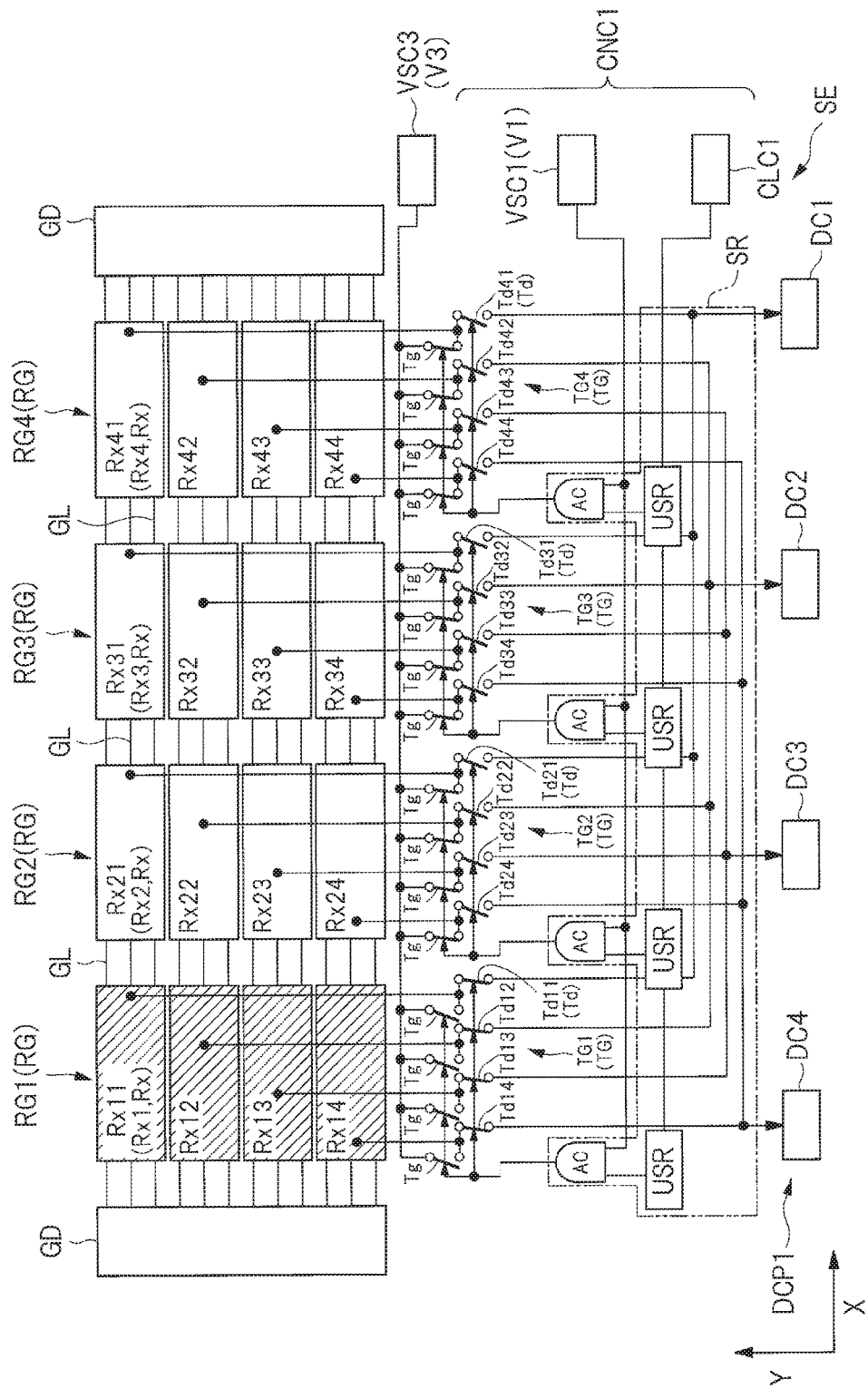
FIG. 21 is a view illustrating a touch sensing circuit of the display device according to the comparative example.

Next, the touch sensing circuit of the display device according to the comparative example will be described with reference to FIG. 21. FIG. 21 is a view illustrating the touch sensing circuit of the display device according to the comparative example In FIG. 21, the sensing electrodes Rx11, Rx12, Rx13 and Rx 14 included in the electrode group RG1 are hatched to show that the sensing electrodes Rx11, Rx12, Rx13 and Rx 14 are selected in the step S111.

The display device according to the comparative example differs from the display device according to the first embodiment in that the connection circuit CNC1 does not include the voltage supply circuit VSC2 (see FIG. 16), the plurality of OR circuits OC (see FIG. 16) and the switching unit GSP (see FIG. 16). Namely, in the display device according to the comparative example, the sensing unit SE includes the sensing circuit DCP1 and the connection circuit CNC1 like the display device according to the first embodiment, but the connection circuit CNC1 does not include the voltage supply circuit VSC2 and the plurality of OR circuits OC unlike the display device according to the first embodiment. Hence, in each set of the transistor groups TG, the unit register circuits USR and the AND circuits AC, the output of the AND circuit AC is input to the gate electrode of each of the plurality of transistors Td included in the transistor group TG without the OR circuit.

The sensing unit SE supplies the voltage V1 from the voltage supply circuit VSC1 in the step S111 included in the step S101 as the finger approach sensing process. As described above, the transistor Td is in the on state when the voltage V1 is input to the gate electrode. Hence, by supplying the voltage V1 from the voltage supply circuit VSC1, the voltage V1 which is an AND of the output of the voltage supply circuit VSC1 and the output of each of the plurality of unit register circuits USR is input to the gate electrode of each of the plurality of transistors Td included in the selected transistor group TG. Meanwhile, the voltage V1 is not input to the gate electrode of each of the plurality of transistors Td included in the non-selected transistor groups TG.

Figure 22:
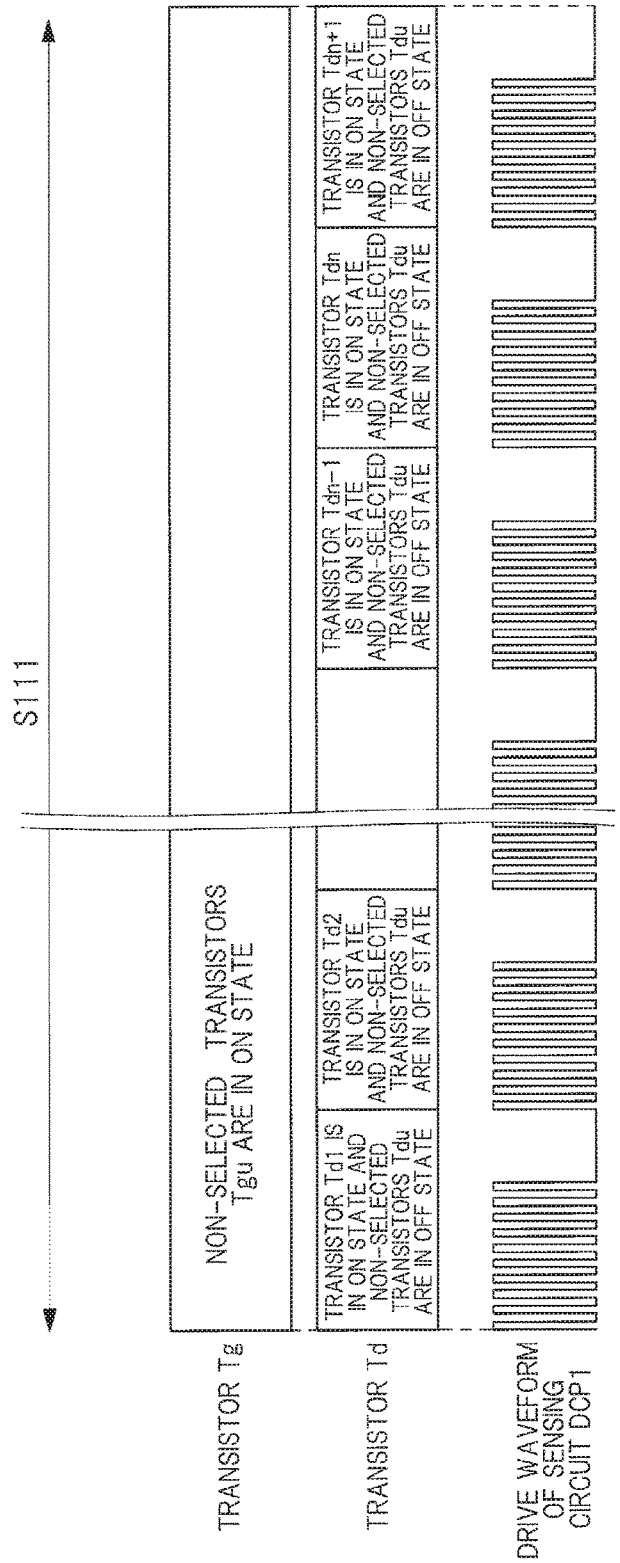
FIG. 22 is a timing chart for explaining a finger approach sensing process of the touch sensing process of the display device according to the comparative example.
Figure 23:
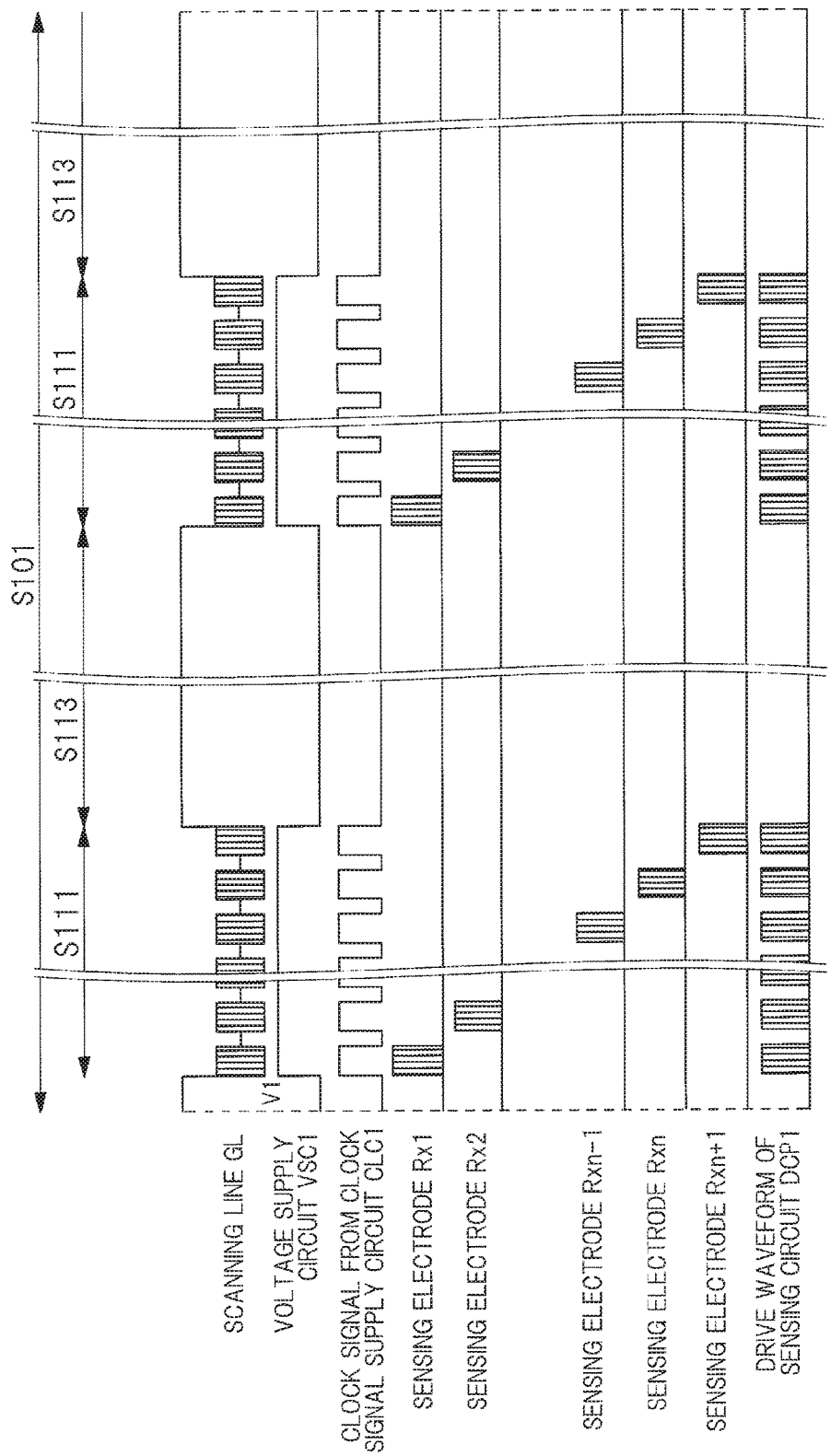
FIG. 23 is a timing chart for explaining the finger approach sensing process of the touch sensing process of the display device according to the comparative example.

Next, a timing chart of the touch sensing process of the display device according to the comparative example will be described with reference to FIGS. 22 and 23. FIGS. 22 and 23 are timing charts for explaining the finger approach sensing process of the touch sensing process of the display device according to the comparative example. FIG. 22 illustrates the timing chart in the case where the step S111 is performed once, and FIG. 23 illustrates the timing chart in the case where the step S111 and the step S113 are each performed twice. FIG. 22 schematically illustrates a state of the transistors Tg, a state of the transistors Td and a drive waveform of the sensing circuit DCP1. FIG. 23 schematically illustrates the voltage of the scanning line GL, the output of the voltage supply circuit VSC1 and the clock signal from the clock signal supply circuit CLC1. Further, FIG. 23 schematically illustrates sensing waveforms of sensing electrodes Rx1, Rx2, Rxn−1, Rxn and Rxn+1 included in the electrode groups RG in a first row, a second row, an n−1 th row, an nth row and an n+1th row (see FIG. 21) when n is an integer of 2 or more, and a drive waveform of the sensing circuit DCP1. Note that hatched portions in FIG. 23 are portions in which a signal having a square wave is sensed or is applied like the areas AR2 illustrating the areas AR1 in an enlarged manner in FIG. 19.

As illustrated in FIG. 22, in the step S111, the selected transistors Tg (selected transistors) among the plurality of transistors Tg are placed in the off state, and the non-selected transistors Tg (non-selected transistors Tgu) among the plurality of transistors Tg are placed in the on state. Further, in the step S111, the selected transistors Td (selected transistor) among the plurality of transistors Td are placed in the on state, and the non-selected transistors Td (non-selected transistors Tdu) among the plurality of transistors Td are placed in the off state.

In FIG. 22, a transistor Td1 connected to the sensing electrode Rx1 in the first row and a transistor Td2 connected to the sensing electrode Rx2 in the second row are sequentially placed in the on state, and non-selected transistors Tdu are placed in the off state. Further, a transistor Tdn−1 connected to the sensing electrode Rxn−1 in the n−1 th row, a transistor Tdn connected to the sensing electrode Rxn in the nth row and a transistor Tdn+1 connected to the sensing electrode Rxn+1 in the n+1th row are sequentially placed in the on state, and the non-selected transistors Tdu are placed in the off state.

As illustrated in FIG. 23, in the step S111, the voltage V1 is supplied from the voltage supply circuit VSC1, and a drive waveform is supplied from the sensing circuit DCP1 in synchronization with the clock signal from the clock signal supply circuit CLC1. Further, sensing waveforms of the sensing electrodes Rx1, Rx2, Rxn−1, Rxn and Rxn+1 are sequentially sensed in synchronization with the clock signal from the clock signal supply circuit CLC1. In addition, in the step S111, the signal V3 as the guard signal is supplied from the guard signal supply circuit VSC3 to the non-selected sensing electrodes Rx in order to prevent the change in the electrostatic capacitance of the selected sensing electrodes Rx from being affected by the non-selected sensing electrodes Rx.

Meanwhile, although not illustrated in FIGS. 22 and 23, in the step S113, all of the plurality of transistors Td are placed in the off state. Further, as illustrated in FIG. 23, in the step S113, the signal V3 is not supplied from the guard signal supply circuit VSC3, and the drive waveform is not supplied from the sensing circuit DCP1. Thus, the sensing waveforms of the sensing electrodes Rx1, Rx2, Rxn−1, Rxn and Rxn+1 are not sensed.

Namely, in the display device according to the comparative example, the sensing unit SE does not connect any one of the plurality of sensing electrodes Rx included in all of the plurality of electrode groups RG to the sensing circuit DCP1, and does not sense the change in the electrostatic capacitance of any of the plurality of sensing electrodes Rx included in all of the plurality of electrode groups RG in the step S113 like the display device according to the first embodiment. However, in the display device according to the comparative example, the sensing unit SE individually senses the electrostatic capacitance of each of the plurality of sensing electrodes Rx by sequentially switching and connecting the plurality of sensing electrodes Rx one by one or in units of several sensing electrodes Rx by the connection circuit CNC1 to the sensing circuit DCP1 in the step S111 unlike the display device according to the first embodiment.

The display device according to the comparative example sequentially selects each of the plurality of electrode groups RG and senses the change in the electrostatic capacitance of the plurality of sensing electrodes Rx included in the selected electrode groups RG, i.e., the selected sensing electrodes Rxs (see FIG. 19) in the step S111 like the step S21. Therefore, the display device according to the comparative example has a problem that a time required for the sensing process becomes long. Further, since the time required for the sensing process becomes long, there is a problem that average power consumption in the step S101 increases when a time interval for the repetition of the step S111 is short.

In order to shorten the time required for the sensing process, a method is conceivable in which the sensing process electrode groups are sequentially selected from part of the plurality of electrode groups RG in the step S111 by, for example, selecting every other electrode group RG instead of sequentially selecting the sensing process electrode groups from all of the plurality of electrode groups RG. According to the method of sequentially selecting the electrode group from part of the plurality electrode groups RG, the time required for the sensing process in the step S111 becomes short. However, since all of the plurality of electrode groups RG are not used for sensing, there is a fear of the occurrence of a sensing error of failing to sense an approach or a contact of an object such as a finger even though there is the approach or the contact of the object.

Further, in order to reduce power consumption, a method is conceivable in which a waiting time (step S113 in FIG. 20) for the repetition of the step S111 is increased. However, since a time taken to sense an approach or a contact of the finger after the occurrence of the approach or the contact of the finger becomes long, there is a fear of the occurrence of a sensing error of failing to sense an approach or a contact of an object such as a finger even though there is the approach or the contact of the object.

In addition, according to a technique disclosed in Patent Document 1 mentioned above, a touch screen drive circuit performs primary sensing on all touch sensors in a touch screen in a primary sensing step to sense the presence or absence of a touch input, and then performs secondary sensing on the touch sensor from which the touch input has been sensed as a result of the primary sensing to sense the position of the touch input.

According to the technique disclosed in Patent Document 1 mentioned above, it is necessary to narrow down a touch input position in the primary sensing step, and thus the sensing process is performed by sequentially selecting Tx lines in the primary sensing step. Namely, the primary sensing step disclosed in Patent Document 1 is to narrow down a touch input position and has a different purpose from that of the finger approach sensing process according to the first embodiment.

Further, like the comparative example, even the technique disclosed in Patent Document 1 cannot prevent or suppress occurrence of a sensing error while shortening the time required for the sensing process and reducing power consumption in the primary sensing step, i.e., the finger approach sensing process performed as the standby mode before the finger coordinate sensing process as the sensing mode.

In addition, according to the technique disclosed in Patent Document 1, drive electrodes for touch sensing are formed in a layer different from a layer of sensing electrodes for touch sensing, and a touch sensing is performed by using the mutual-capacitive method. Hence, the touch sensor device disclosed in Patent Document 1 differs from the input device according to the first embodiment in which only the sensing electrodes for touch sensing are formed in the same layer and the touch sensing is performed by using the self-capacitive method.

Main Characteristics of Present Embodiment

A technical idea of the display device according to the first embodiment is to solve the problems of the display device according to the comparative example described above, and this technical idea is to prevent or suppress occurrence of a sensing error while shortening the time required for the sensing process and reducing power consumption in the finger approach sensing process performed as the standby mode before the finger coordinate sensing process as the sensing mode.

Namely, in the display device according to the first embodiment, the sensing unit SE performs the sensing process (step S11 in FIG. 15) of sensing an approach or a contact of an object to the display panel from an outside by selecting all of the plurality of sensing electrodes Rx provided in the matrix pattern as a plurality of sensing process electrodes, and collectively sensing the electrostatic capacitance of each of the plurality of selected sensing process electrodes. When the approach or the contact of an object is not sensed in the step S11, the sensing unit SE repeats the step S11. When the approach or the contact of an object is sensed in the step S11, the sensing unit SE performs the sensing process (step S21 in FIG. 15) of sensing a position of the object by individually sensing the electrostatic capacitance of each of the plurality of sensing electrodes Rx.

Consequently, it is possible to select all of the plurality of electrode groups RG as the plurality of sensing process electrode groups and select the plurality of sensing electrodes Rx included in each of the plurality of selected sensing process electrode groups as the plurality of sensing process electrodes, and collectively sense the change in the electrostatic capacitance of each of the plurality of selected sensing process electrodes in the step S11. Accordingly, it is possible to shorten the time required for the sensing process. Further, since the time required for the sensing process becomes short, even when the time interval for the repetition of the step S11 is short, it is possible to reduce the average power consumption in the finger approach sensing process (step S1 in FIG. 15).

According to the first embodiment, it is not necessary to sequentially select the sensing process electrode groups from part of the plurality of electrode groups RG by, for example, selecting every other electrode group RG in the step S11 in order to shorten the time required for the sensing process. Hence, all of the plurality of electrode groups RG can be used for sensing, and it is thus possible to prevent or suppress the occurrence of a sensing error of failing to sense an approach or a contact of an object such as a finger even though there is the approach or the contact of the object.

Further, according to the first embodiment, it is not necessary to increase the waiting time (step S13 in FIG. 15) for the repetition of the step S11 in order to reduce the power consumption. Hence, it is possible to shorten a time taken to sense an approach or a contact of the finger after the occurrence of the approach or the contact of the finger, and it is possible to prevent or suppress the occurrence of a sensing error of failing to sense an approach or a contact of an object such as a finger even though there is the approach or the contact of the object.

Namely, the display device according to the first embodiment can prevent or suppress the occurrence of a sensing error while shortening the time required for the sensing process and reducing power consumption in the finger approach sensing process performed as the standby mode before the finger coordinate sensing process as the sensing mode.

As described above, it is preferable that the sensing unit SE supplies the voltage V2 from the voltage supply circuit VSC2 to the gate electrode of each of the switching elements GSW and performs the step S11 in the state where the plurality of scanning lines GL are electrically floating. Consequently, it is possible to reduce the parasitic capacitance included via the scanning lines GL among the parasitic capacitance of each of the plurality of sensing electrodes Rx. Accordingly, it is possible to improve the sensing precision for performing the step S11 and to reduce power consumption for performing the step S11.

First Modified Example of First Embodiment

Figure 24:
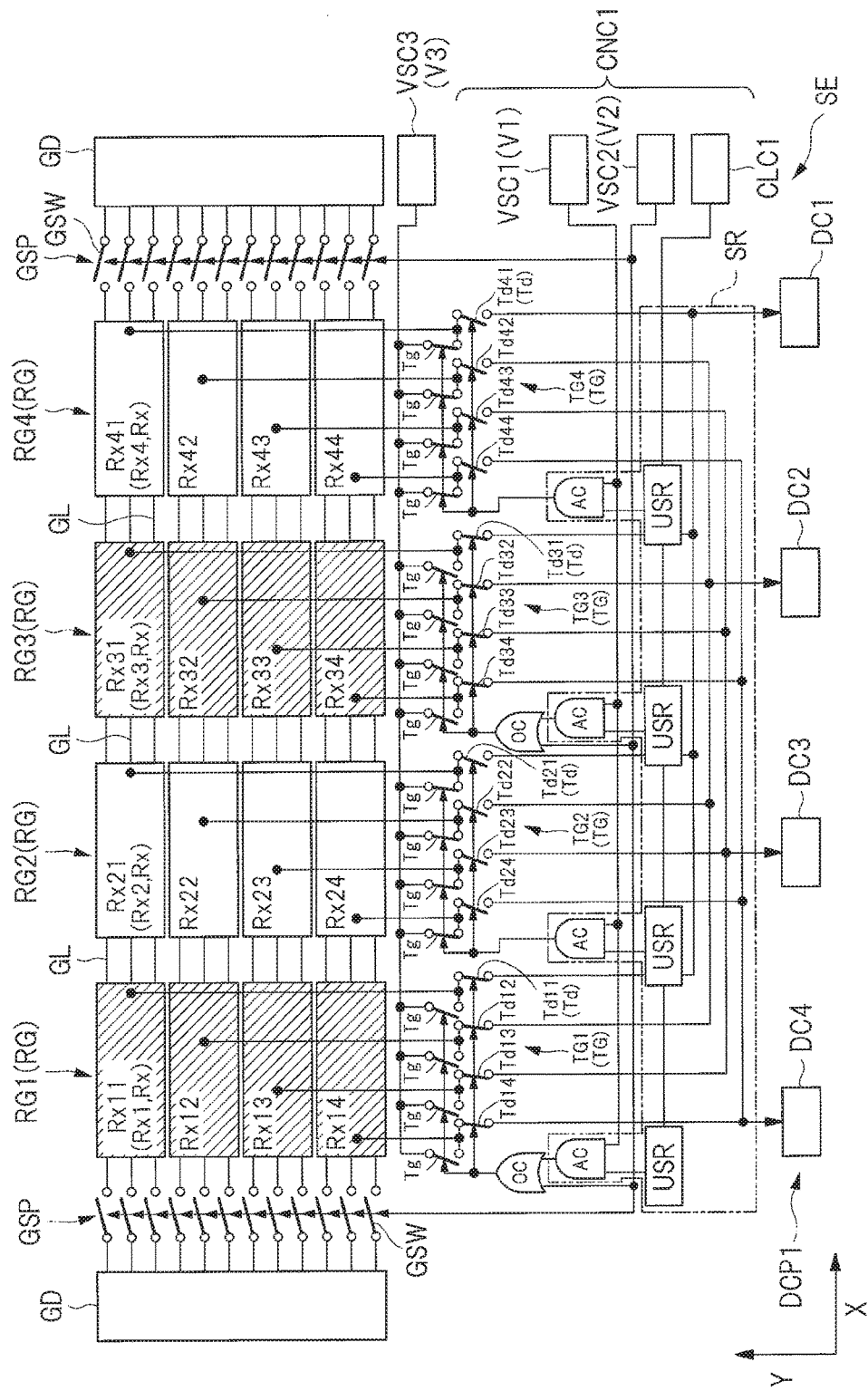
FIG. 24 is a view illustrating a touch sensing circuit of a first modified example of the display device according to the first embodiment.

Next, a first modified example of the first embodiment will be described. FIG. 24 is a view illustrating a touch sensing circuit of the first modified example of the display device according to the first embodiment. In FIG. 24, the plurality of sensing electrodes Rx included in each of the electrode groups RG1 and RG3 are hatched to show that the plurality of sensing electrodes Rx included in each of the electrode groups RG1 and RG3 are selected in the step S11.

In this first modified example, in the step S11, the sensing unit SE selects the electrode groups RG which are not adjacent to each other by selecting every other electrode group RG or every few electrode groups RG as the plurality of sensing process electrode groups, and selects the plurality of sensing electrodes Rx included in each of the plurality of selected sensing process electrode groups as the plurality of sensing process electrodes. Then, an approach or a contact of an object is sensed by collectively sensing the change in the electrostatic capacitance of each of the plurality of selected sensing process electrodes. Namely, in the first modified example, in the step S11, the sensing unit SE selects part of the plurality of sensing electrodes Rx as the plurality of sensing process electrodes and collectively senses the electrostatic capacitance of each of the plurality of selected sensing process electrodes, thereby sensing an approach or a contact of an object.

In addition, in the step S11, the sensing unit SE may select the sensing electrodes Rx which are not adjacent to each other by selecting every other sensing electrode Rx or every few sensing electrodes Rx in the X axis direction or the Y axis direction as the plurality of sensing process electrodes. Then, an approach or a contact of an object may be sensed by collectively sensing the change in the electrostatic capacitance of each of the plurality of selected sensing process electrodes.

The display device according to the first modified example differs from the display device according to the first embodiment in that the connection circuit CNC1 does not include OR circuits OC whose outputs are input to a gate electrode of each of the plurality of transistors Td included in at least one of two adjacent transistor groups TG, and is the same as the display device according to the first embodiment in the other points. Namely, in the first modified example, the sensing unit SE includes the sensing circuit DCP1 and the connection circuit CNC1 like the first embodiment, but the connection circuit CNC1 does not include part of the OR circuits OC unlike the first embodiment.

With respect to the electrode groups RG selected as the sensing process electrode groups in the step S11, in each set of the transistor groups TG, the unit register circuits USR and the OR circuits OC, the output of the OR circuit OC is input to the gate electrode of each of the plurality of transistors Td included in the transistor group TG like the display device according to the first embodiment.

Meanwhile, with respect to the electrode groups RG which are not selected as the sensing process electrode groups in the step S11, in each set of the transistor groups TG, the unit register circuits USR and the AND circuits AC, the output of the AND circuit AC is input to the gate electrode of each of the plurality of transistors Td included in the transistor group TG without the OR circuit.

The sensing unit SE supplies the voltage V2 from the voltage supply circuit VSC2 in the step S11 included in the step S1 as the finger approach sensing process.

At this time, with respect to the electrode groups RG selected as the sensing process electrode groups, the voltage V2 is input to the gate electrode of each of the plurality of transistors Td as an OR of the output of the voltage supply circuit VSC2 and the output of each of the plurality of unit register circuits USR, and is input to the gate electrode of each of the plurality of transistors Tg. Hence, each of the plurality of transistors Td is placed in the on state, each of the plurality of transistors Tg is placed in the off state, and each of the plurality of sensing electrodes Rx included in the electrode groups RG selected as the sensing process electrode groups is connected to the sensing circuit DCP1.

Meanwhile, with respect to the electrode groups RG which are not selected as the sensing process electrode groups, the voltage V2 is not input to the gate electrode of each of the plurality of transistors Td, and is not input to the gate electrode of each of the plurality of transistors Tg. Hence, each of the plurality of transistors Td is placed in the off state, each of the plurality of transistors Tg is placed in the on state, and each of the plurality of sensing electrodes Rx included in the electrode groups RG which are not selected as the sensing process electrode groups is not connected to the sensing circuit DCP1.

Thus, with respect to the electrode groups RG selected as the sensing process electrode groups, the sensing unit SE collectively senses the change in the electrostatic capacitance of each of the plurality of sensing electrodes Rx in the step S11. Meanwhile, with respect to the electrode groups RG which are not selected as the sensing process electrode groups, the sensing unit SE does not sense the change in the electrostatic capacitance of each of the plurality of sensing electrodes Rx in the step S11.

In the example illustrated in FIG. 24, the electrode groups RG1 and RG3 are selected as the sensing process electrode groups, and the change in the electrostatic capacitance of the sensing electrodes Rx11, Rx12, Rx13, Rx14, Rx31, Rx32, Rx33 and Rx34 included in the electrode groups RG1 and RG3 selected as the sensing process electrode groups is collectively sensed. Further, in the example illustrated in FIG. 24, the electrode groups RG2 and RG4 are not selected as the sensing process electrode groups, and the change in the electrostatic capacitance of the sensing electrodes Rx21, Rx22, Rx23, Rx24, Rx41, Rx42, Rx43 and Rx44 included in the electrode groups RG2 and RG4 which are not selected as the sensing process electrode groups is not sensed.

In the first modified example, unlike the first embodiment, in the step S11, for example, part of the plurality of electrode groups RG are selected as the plurality of sensing process electrode groups, and the plurality of sensing electrodes Rx included in each of the plurality of selected sensing process electrode groups are selected as the plurality of sensing process electrodes. Then, the change in the electrostatic capacitance of each of the plurality of sensing process electrodes is collectively sensed. Hence, in the first modified example, it is possible to further shorten a time required for the sensing process in the step S11 in comparison with the first embodiment.

Further, in the first modified example, the number of the sensing electrodes Rx whose change in the electrostatic capacitance is collectively sensed is reduced in comparison with the first embodiment, and it is thus possible to reduce the average power consumption in the finger approach sensing process (step S1 in FIG. 15). In the first modified example, however, the number of the sensing electrodes Rx whose change in the electrostatic capacitance is collectively sensed is reduced in comparison with the first embodiment, and thus the first embodiment provides a greater effect of preventing or suppressing the occurrence of a sensing error.

Namely, in the first modified example, in the step S11, part of the plurality of electrode groups RG are selected as the plurality of sensing process electrode groups, but the other part of the plurality of electrode groups RG are not selected as the plurality of sensing process electrode groups. For example, a case where a total sum of the capacitance of the sensing electrodes Rx connected to the sensing circuit DCP1 is large, and thus the change in the electrostatic capacitance of each of the plurality of sensing electrodes Rx cannot be easily collectively sensed will be considered. In such a case, it is desirable that the number of OR circuits OC is reduced by providing the OR circuits OC so as to correspond to only part of the electrode groups RG selected as the sensing process electrode groups like the first modified example. In this manner, it is possible to reduce the number of sensing electrodes Rx connected to the sensing circuit DCP1 and reduce the total sum of the capacitance of the sensing electrodes Rx connected to the sensing circuit DCP1 in the step S11.

Second Modified Example of First Embodiment

Figure 25:
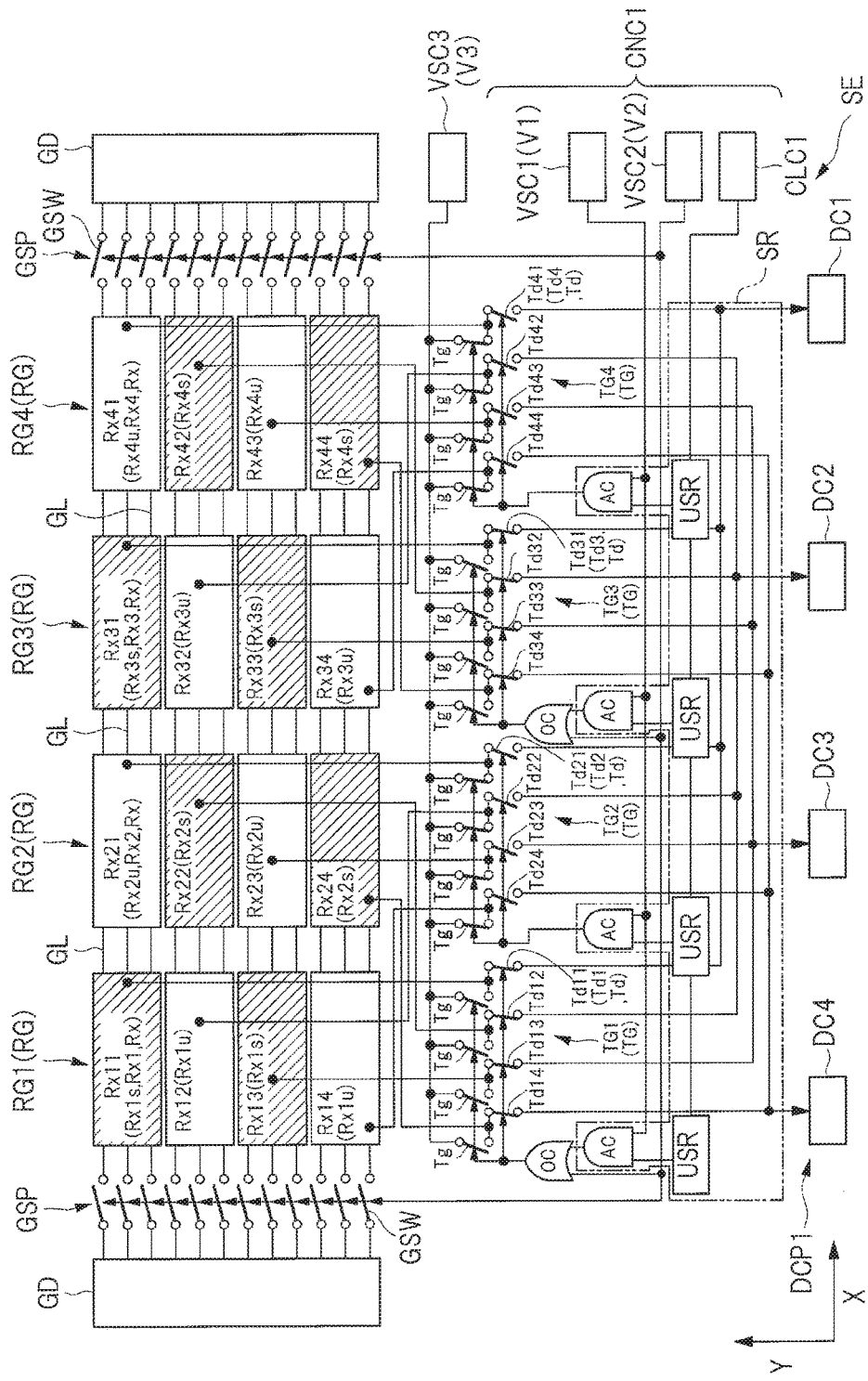
FIG. 25 is a view illustrating a touch sensing circuit of a second modified example of the display device according to the first embodiment.

Next, the second modified example of the first embodiment will be described. FIG. 25 is a view illustrating a touch sensing circuit of the second modified example of the display device according to the first embodiment. In FIG. 25, part of the plurality of sensing electrodes Rx are hatched to show that the hatched sensing electrodes Rx are selected among the plurality of sensing electrodes Rx in the step S11.

In the second modified example, in the step S11, the sensing unit SE selects the sensing electrodes Rx which are not adjacent to each other by selecting every other sensing electrode Rx or every few sensing electrodes Rx in any of the X axis direction and the Y axis direction as the plurality of sensing process electrodes. Then, an approach or a contact of an object is sensed by collectively sensing the change in the electrostatic capacitance of each of the plurality of selected sensing process electrodes. Namely, also in the second modified example, the sensing unit SE selects part of the plurality of sensing electrodes Rx as the plurality of sensing process electrodes and collectively senses the electrostatic capacitance of each of the plurality of selected sensing process electrodes, thereby sensing an approach or a contact of an object like the first modified example.

In the second modified example, each of the plurality of electrode groups RG includes the sensing electrodes Rx which are connected to the transistors Td having the gate electrodes to which outputs of the OR circuits OC are input and the sensing electrodes Rx which are connected to the transistors Td having the gate electrodes to which outputs of the AND circuits AC are input without the OR circuits OC. Further, in each of the plurality of electrode groups RG, the sensing electrodes Rx which are connected to the transistors Td having the gate electrodes to which outputs of the OR circuits OC are input and the sensing electrodes Rx which are connected to the transistors Td having the gate electrodes to which outputs of the AND circuits AC are input without the OR circuits OC are alternately arranged in the Y axis direction.

More specifically, in the example illustrated in FIG. 25, the outputs of the OR circuits OC are input to the gate electrode of each of the plurality of transistors Td11, Td12, Td13 and Td14 included in the transistor group TG1. Further, the transistor Td11 connects the sensing electrode Rx11 to the sensing circuit DC1, the transistor Td12 connects the sensing electrode Rx22 to the sensing circuit DC2, the transistor Td13 connects the sensing electrode Rx13 to the sensing circuit DC3, and the transistor Td14 connects the sensing electrode Rx24 to the sensing circuit DC4.

Meanwhile, in the example illustrated in FIG. 25, the outputs of the AND circuits AC are input to the gate electrode of each of the plurality of transistors Td21, Td22, Td23 and Td24 included in the transistor group TG2 without the OR circuits OC. Further, the transistor Td21 connects the sensing electrode Rx21 to the sensing circuit DC1, the transistor Td22 connects the sensing electrode Rx12 to the sensing circuit DC2, the transistor Td23 connects the sensing electrode Rx23 to the sensing circuit DC3, and the transistor Td24 connects the sensing electrode Rx14 to the sensing circuit DC4.

Further, in the example illustrated in FIG. 25, the outputs of the OR circuits OC are input to the gate electrode of each of the plurality of transistors Td31, Td32, Td33 and Td34 included in the transistor group TG3. Further, the transistor Td31 connects the sensing electrode Rx31 to the sensing circuit DC1, the transistor Td32 connects the sensing electrode Rx42 to the sensing circuit DC2, the transistor Td33 connects the sensing electrode Rx33 to the sensing circuit DC3, and the transistor Td34 connects the sensing electrode Rx44 to the sensing circuit DC4.

Meanwhile, in the example illustrated in FIG. 25, the outputs of the AND circuits AC are input to the gate electrode of each of the plurality of transistors Td41, Td42, Td43 and Td44 included in the transistor group TG4 without the OR circuits OC. Further, the transistor Td41 connects the sensing electrode Rx41 to the sensing circuit DC1, the transistor Td42 connects the sensing electrode Rx32 to the sensing circuit DC2, the transistor Td43 connects the sensing electrode Rx43 to the sensing circuit DC3, and the transistor Td44 connects the sensing electrode Rx34 to the sensing circuit DC4.

Namely, in the second modified example, the sensing unit SE includes the two electrode groups RG1 and RG2 which are adjacent to each other in the X axis direction and the two transistor groups TG1 and TG2 which are adjacent to each other in the X axis direction. The transistor group TG1 includes the plurality of transistors Td1, and the transistor group TG2 includes the plurality of transistors Td2. The output of the voltage supply circuit VSC2 is input to the gate electrode of each of the plurality of transistors Td1 via the OR circuits OC, and the output of the voltage supply circuit VSC2 is not input to the gate electrode of each of the plurality of transistors Td2.

The electrode group RG1 includes a plurality of sensing electrodes Rx1s and a plurality of sensing electrodes Rx1u, and the electrode group RG2 includes a plurality of sensing electrodes Rx2s and a plurality of sensing electrodes Rx2u. Each of the plurality of sensing electrodes Rx1s and the plurality of sensing electrodes Rx2s is connected to the sensing circuit DCP1 via each of the plurality of transistors Td1 included in the transistor group TG1. Each of the plurality of sensing electrodes Rx1u and the plurality of sensing electrodes Rx2u is connected to the sensing circuit DCP1 via each of the plurality of transistors Td2 included in the transistor group TG2.

The sensing electrodes Rx1s and the sensing electrodes Rx1u are alternately arranged in the Y axis direction, and the sensing electrodes Rx2s and the sensing electrodes Rx2u are alternately arranged in the Y axis direction. The sensing electrodes Rx1s and the sensing electrodes Rx2u are adjacent in the X axis direction, and the sensing electrodes Rx1u and the sensing electrodes Rx2s are adjacent in the X axis direction.

The electrode group RG3 includes a plurality of sensing electrodes Rx3s and a plurality of sensing electrodes Rx3u, and the electrode group RG4 includes a plurality of sensing electrodes Rx4s and a plurality of sensing electrodes Rx4u. Each of the plurality of sensing electrodes Rx3s and the plurality of sensing electrodes Rx4s is connected to the sensing circuit DCP1 via each of the plurality of transistors Td3 included in the transistor group TG3. Each of the plurality of sensing electrodes Rx3u and the plurality of sensing electrodes Rx4u is connected to the sensing circuit DCP1 via each of the transistors Td4 included in the transistor group TG4.

The sensing electrodes Rx3s and the sensing electrodes Rx3u are alternately arranged in the Y axis direction, and the sensing electrodes Rx4s and the sensing electrodes Rx4u are alternately arranged in the Y axis direction. The sensing electrodes Rx3s and the sensing electrodes Rx4u are adjacent in the X axis direction, and the sensing electrodes Rx3u and the sensing electrodes Rx4s are adjacent in the X axis direction. Further, the sensing electrodes Rx2s and the sensing electrodes Rx3u are adjacent in the X axis direction, and the sensing electrodes Rx2u and the sensing electrodes Rx3s are adjacent in the X axis direction. Furthermore, the sensing process electrodes including the plurality of sensing electrodes Rx1s, Rx2s, Rx3s and Rx4s form a checkered pattern.

The sensing unit SE does not supply the voltage V1 from the voltage supply circuit VSC1 in the step S11 included in the step S1 as the finger approach sensing process, and supplies the voltage V2 from the voltage supply circuit VSC2.

In this case, with respect to the plurality of sensing electrodes Rx selected as the sensing process electrodes, the voltage V2 is input to the gate electrode of each of the plurality of transistors Tg as an OR of the output of the voltage supply circuit VSC2 and the output of each of the plurality of unit register circuits USR, and is input to the gate electrode of each of the plurality of transistors Tg. Hence, each of the plurality of transistors Td is placed in the on state, each of the plurality of transistors Tg is placed in the off state, and each of the plurality of sensing electrodes Rx selected as the sensing process electrodes is connected to the sensing circuit DCP1.

Meanwhile, with respect to the plurality of sensing electrodes Rx which are not selected as the sensing process electrodes, the voltage V2 is not input to the gate electrode of each of the plurality of transistors Td, and is not input to the gate electrode of each of the plurality of transistors Tg. Hence, each of the plurality of transistors Td is placed in the on state, each of the plurality of transistors Tg is placed in the off state, and each of the plurality of sensing electrodes Rx which is not selected as the sensing process electrode is not connected to the sensing circuit DCP1.

More specifically, in the example illustrated in FIG. 25, the sensing electrodes Rx11, Rx22, Rx13, Rx24, Rx31, Rx42, Rx33 and Rx44 are connected to the sensing circuit DCP1, and the sensing electrodes Rx21, Rx12, Rx23, Rx14, Rx41, Rx32, Rx43 and Rx34 are not connected to the sensing circuit DCP1. Thus, it is possible to collectively sense the change in electrostatic capacitance of the sensing electrodes Rx11, Rx22, Rx13, Rx24, Rx31, Rx42, Rx33 and Rx44 in the step S11.

In the second modified example, unlike the first embodiment, for example, part of the plurality of sensing electrodes Rx are selected as the plurality of sensing process electrodes, and the change in electrostatic capacitance of each of the plurality of sensing process electrodes is collectively sensed in the step S11. Hence, also in the second modified example, like the first modified example of the first embodiment, it is possible to further shorten the time required for the sensing process in the step S11 in comparison with the first embodiment.

Further, also in the second modified example, like the first modified example of the first embodiment, the number of the sensing electrodes Rx whose change in the electrostatic capacitance is collectively sensed is reduced in comparison with the first embodiment, and it is thus possible to reduce the average power consumption in the finger approach sensing process (step S1 in FIG. 15). Also in the second modified example, however, like the first modified example of the first embodiment, the number of the sensing electrodes Rx whose change in the capacitance is collectively sensed is reduced in comparison with the first embodiment, and thus the first embodiment provides a greater effect of preventing or suppressing the occurrence of a sensing error.

Also in the second modified example, like the first modified example of the first embodiment, it is possible to reduce the number of the sensing electrodes Rx connected to the sensing circuit DCP1, and to reduce the total sum of the capacitance of the sensing electrodes Rx connected to the sensing circuit DCP1.

Third Modified Example of First Embodiment

Figure 26:
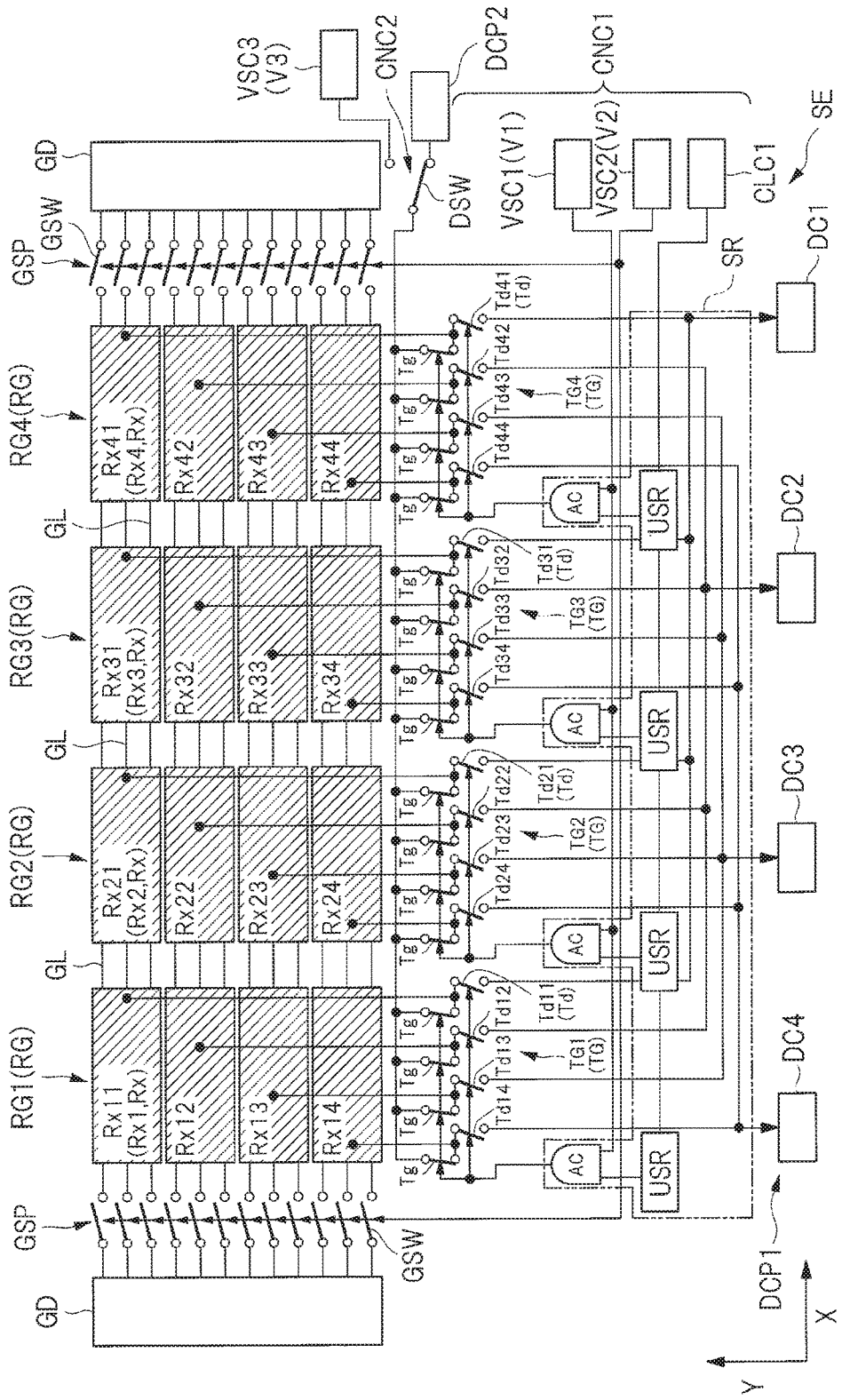
FIG. 26 is a view illustrating a touch sensing circuit of a third modified example of the display device according to the first embodiment.

Next, the third modified example of the first embodiment will be described. FIG. 26 is a view illustrating a touch sensing circuit of the third modified example of the display device according to the first embodiment. In FIG. 26, all of the plurality of sensing electrodes Rx are hatched to show that all of the plurality of sensing electrodes Rx are selected in the step S11.

The display device according to the third modified example differs from the display device according to the first embodiment in that the sensing unit SE includes a sensing circuit DCP2 in addition to the sensing circuit DCP1 and includes a connection circuit CNC2 in addition to the connection circuit CNC1, and the connection circuit CNC1 does not include the plurality of OR circuits, and is the same as the display device according to the first embodiment in the other points. Namely, in the display device according to the third modified example, the sensing unit SE includes the sensing circuit DCP1 and the connection circuit CNC1 like the display device according to the first embodiment, but the sensing unit SE further includes the sensing circuit DCP2 and the connection circuit CNC2 and the connection circuit CNC1 does not include the plurality of OR circuits unlike the display device according to the first embodiment. Hence, the voltage supply circuit VSC2 supplies the voltage V2 to the gate electrode of each of the plurality of switching elements GSW, but does not supply the voltage V2 to each of the plurality of transistor groups TG. Note that the connection circuit CNC2 includes the plurality of transistors Tg and the switching element DSW.

The sensing circuit DCP2 can be configured similarly to the sensing circuit DCP1. The sensing circuit DCP2 and the guard signal supply circuit VSC3 are switchably connected to each of the plurality of transistors Tg via the switching element DSW included in the connection circuit CNC2. Hence, the plurality of transistors Tg and the switching element DSW switchably connect the plurality of sensing electrodes Rx to the sensing circuit DCP2.

Further, in the third modified example, the connection circuit CNC1 does not include the plurality of OR circuits unlike the display device according to the first embodiment. Hence, in each set of the transistor groups TG, the unit register circuits USR and the AND circuits AC, the output of the AND circuit AC is input to the gate electrode of each of the plurality of transistors Td included in the transistor group TG without the OR circuit.

The sensing unit SE does not supply the voltage V1 from the voltage supply circuit VSC1 in the step S111 included in the step S1 as the finger approach sensing process. At this time, the voltage V1 is not input to the gate electrode of each of the plurality of transistors Td, and is not input to the gate electrode of each of the plurality of transistors Tg. Hence, each of the plurality of transistors Td is placed in the off state, each of the plurality of transistors Tg is placed in the on state, and each of the plurality of sensing electrodes Rx is not connected to the sensing circuit DCP1.

Meanwhile, the sensing unit SE connects the sensing circuit DCP2 and each of the plurality of transistors Tg via the switching element DSW in the step S11. Hence, the plurality of sensing electrodes Rx are connected to the sensing circuit DCP2 by the plurality of transistors Tg and the switching element DSW. Thus, each of the plurality of sensing electrodes Rx is connected to the sensing circuit DCP2. Namely, the sensing unit SE can select all of the plurality of sensing electrodes Rx as the plurality of sensing process electrodes. Further, also in the third modified example, like the first embodiment, the sensing unit SE selects all of the plurality of sensing electrodes Rx as the plurality of sensing process electrodes and collectively senses the change in electrostatic capacitance of each of the plurality of selected sensing process electrodes, thereby sensing an approach or a contact of an object such as a finger to the touch sensing surface in the step S11.

Meanwhile, in the third modified example, unlike the first embodiment, for example, the plurality of OR circuits OC (see FIG. 16) may not be provided so as to correspond to each of the plurality of electrode groups RG. Hence, in the third modified example, it is possible to simplify the configuration of the connection circuit CNC1 in comparison with the first embodiment.

Second Embodiment

An example where a touch panel as an input device is applied to an in-cell type display device with touch sensing function in which sensing electrodes of the input device are provided in a display panel of the display device and function as common electrodes of the display device has been described in the first embodiment. On the other hand, an example where a touch panel as an input device is applied to an input device which can be used as a liquid crystal display device with touch sensing function by externally attaching the touch panel to a display surface of the liquid crystal display device will be described in the second embodiment. Note that the input device according to the second embodiment can be externally attached to display surfaces of various display devices such as an organic EL (Electroluminescence) display device in addition to the liquid crystal display device.

<Input Device>

Figure 27:
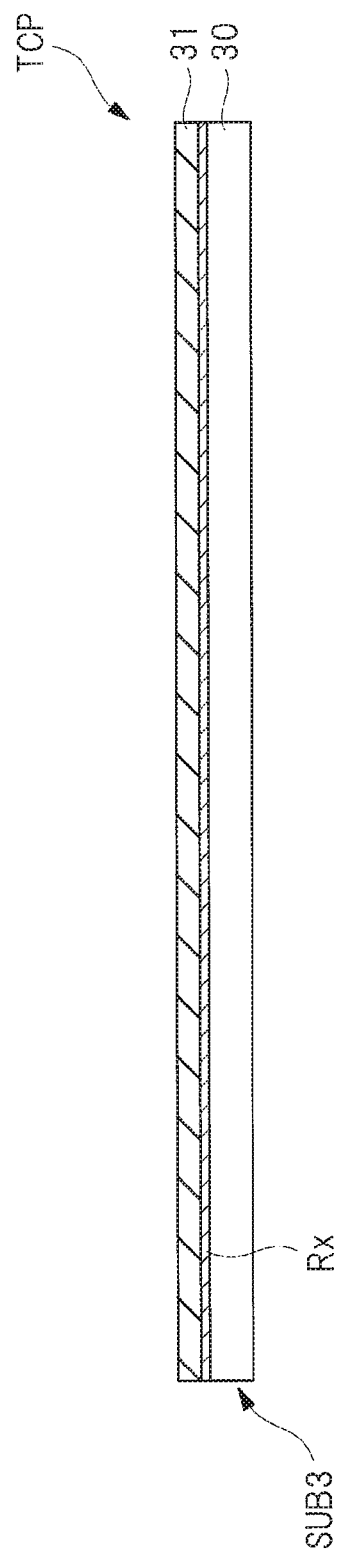
FIG. 27 is a sectional view illustrating an input device according to a second embodiment.

FIG. 27 is a sectional view illustrating the input device according to the second embodiment. In the example illustrated in FIG. 27, an input device TCP includes a substrate SUB3. The substrate SUB3 includes an insulating substrate 30 having optical transparency such as a glass substrate or a resin substrate. Further, the substrate SUB3 includes a sensing electrode Rx and an insulating film 31 on one side of the substrate SUB3. The sensing electrode Rx is made of a transparent conductive material such as ITO or IZO. The insulating film 31 is disposed on the sensing electrode Rx and the insulating substrate 30.

Further, although not illustrated in FIG. 27, the input device TCP can be configured similarly to that of the display device according to the first embodiment except that the input device TCP does not include portions having only display functions of the display device such as the scanning line drive circuit GD (see FIG. 16), the scanning lines GL (see FIG. 16) and the switching unit GSP (see FIG. 16).

Hence, like the display device according to the first embodiment, the input device TCP includes the sensing unit SE (see FIG. 16) and the sensing unit SE includes the sensing circuit DCP1 (see FIG. 16) and the connection circuit CNC1 (see FIG. 16). Further, the connection circuit CNC1 includes the plurality of transistor groups TG (see FIG. 16), the plurality of unit register circuits USR (see FIG. 16) and the voltage supply circuit VSC2 (see FIG. 16). Furthermore, the arrangement of the plurality of sensing electrodes Rx and the connection of the plurality of sensing electrodes Rx to the sensing circuit DCP1 via the connection circuit CNC1 can be the same as those in the first embodiment described with reference to FIG. 16 and the first to third modified examples of the first embodiment described with reference to FIGS. 24 to 26. Hence, when the substrate SUB3 is seen from a vertical direction, i.e., seen in a plan view, the plurality of sensing electrodes Rx are provided in a matrix pattern on the substrate SUB3. Further, the sensing unit SE senses the electrostatic capacitance of each of the plurality of sensing electrodes Rx.

Furthermore, in the display device which is the same as the display device according to the first embodiment except that the common electrodes CE have the display function but do not have the touch sensing function, the input device TCP according to the second embodiment can be provided between the optical element OD2 (see FIG. 3) and the substrate SUB2 (see FIG. 3). Consequently, the display device whose common electrodes CE have the display function but do not have the touch sensing function can be provided as a display device with touch sensing function.

Also in the input device according to the second embodiment, the sensing unit SE (see FIG. 16) performs the step S11 (see FIG. 15) like the input device provided in each of the display devices according to the first embodiment and the first to third modified examples of the first embodiment. In the step S11, the sensing unit SE selects all or part of the plurality of sensing electrodes Rx provided in the matrix pattern as the plurality of sensing process electrodes and collectively senses the electrostatic capacitance of each of the plurality of selected sensing process electrodes, thereby sensing an approach or a contact of an object to a substrate from an outside. When the approach or the contact of the object has not been sensed in the step S11, the sensing unit SE repeats the step S11. When the approach or the contact of the object has been sensed in the step S11, the sensing unit SE performs the step S21 (see FIG. 15). The sensing unit SE senses a position of the object by individually sensing the change in electrostatic capacitance of each of the plurality of sensing electrodes Rx in the step S21.

Further, the input device according to the second embodiment can prevent or suppress the occurrence of a sensing error while shortening the time required for the sensing process and reducing power consumption in the finger approach sensing process performed as the standby mode before the finger coordinate sensing process as the sensing mode like the display device according to the first embodiment.

In the foregoing, the invention made by the inventors of the present invention has been concretely described based on the embodiments. However, it is needless to say that the present invention is not limited to the foregoing embodiments and various modifications and alterations can be made within the scope of the present invention.

Further, in the foregoing embodiments, the cases of a liquid crystal display device have been illustrated as disclosure examples, but any kinds of flat-panel display devices such as an organic EL display device, other self-luminous type display devices and electronic paper display devices having electrophoresis elements can be listed as other application examples. Further, it goes without saying that the present invention is applicable to small, medium and large sized devices without any particular limitation.

In the category of the idea of the present invention, a person with ordinary skill in the art can conceive various modification examples and revised examples, and such modification examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention is effectively applied to a display device and an input device.

What is claimed is:
1. A display device comprising:
a display panel having a display surface on which images are displayed;
a plurality of first electrodes provided in a matrix pattern in the display panel when seen in a plan view;
a sensing unit which senses electrostatic capacitance of each of the plurality of first electrodes; and
a plurality of second electrode groups arranged in a fifth direction when seen in a plan view,
wherein the sensing unit performs a first sensing process of selecting all or part of the plurality of first electrodes as a plurality of sensing process electrodes and collectively sensing electrostatic capacitance of each of the plurality of selected sensing process electrodes, thereby sensing an approach or a contact of an object to the display panel,
in a case where the approach or the contact of the object has not been sensed in the first sensing process, the sensing unit repeats the first sensing process, and
in a case where the approach or the contact of the object has been sensed in the first sensing process, the sensing unit performs a second sensing process of sensing a position of the object by individually sensing the electrostatic capacitance of each of the plurality of first electrodes,
wherein the sensing unit includes:
a sensing circuit which senses electrostatic capacitance of each of the plurality of first electrodes; and
a connection circuit which connects each of the plurality of first electrodes to the sensing circuit;
in the first sensing process, the sensing unit collectively senses the electrostatic capacitance of each of the plurality of sensing process electrodes by connecting each of the plurality of selected sensing process electrodes to the sensing circuit via the connection circuit, and
in the second sensing process, the sensing unit individually senses the electrostatic capacitance of each of the plurality of first electrodes by sequentially switching and connecting the plurality of first electrodes one by one or in units of several first electrodes to the sensing circuit via the connection circuit, and
wherein each of the plurality of second electrode groups includes the plurality of first electrodes arranged in a sixth direction crossing the fifth direction when seen in a plan view,
the connection circuit includes a plurality of transistor groups which connect each of the plurality of second electrode groups to the sensing circuit,
each of the plurality of transistor groups includes a plurality of first field effect transistors,
each of the plurality of first field effect transistors includes a first gate electrode,
in each pair of the second electrode groups and the transistor groups, the plurality of first field effect transistors included in the transistor group connect each of the plurality of first electrodes included in the second electrode group to the sensing circuit,
the connection circuit further includes:
a plurality of unit register circuits which supply a first gate voltage of the first field effect transistor to each of the plurality of transistor groups;

a voltage supply circuit which supplies a second gate voltage of the first field effect transistor to each of the plurality of transistor groups; and a plurality of OR circuits which calculate an OR of an output of the voltage supply circuit and an output of each of the plurality of unit register circuits, the plurality of unit register circuits form a shift register circuit, in each set of the transistor groups, the unit register circuits and the OR circuits, an output of the OR circuit is input to the first gate electrode of each of the plurality of first field effect transistors included in the transistor group, the first field effect transistor is in an on state even when any of the first gate voltage and the second gate voltage is input to the first gate electrode, and in the first sensing process, the sensing unit selects the plurality of first electrodes included in each of the plurality of second electrode groups as the plurality of sensing process electrodes by supplying the second gate voltage from the voltage supply circuit.

2. The display device according to claim 1, further comprising:

a plurality of first electrode groups arranged in a first direction when seen in a plan view, wherein each of the plurality of first electrode groups includes the plurality of first electrodes arranged in a second direction crossing the first direction when seen in a plan view, and in the first sensing process, the sensing unit selects part of the plurality of first electrode groups as a plurality of sensing process electrode groups, and selects the plurality of first electrodes included in each of the plurality of selected sensing process electrode groups as the plurality of sensing process electrodes.

3. The display device according to claim 2, wherein, in the first sensing process, the sensing unit selects the plurality of first electrode groups which are not adjacent to each other as the plurality of sensing process electrode groups.

4. The display device according to claim 1, wherein the plurality of first electrodes are arranged in a matrix pattern in a third direction and a fourth direction which cross each other when seen in a plan view, and in the first sensing process, the sensing unit selects some of the plurality of first electrodes which are not adjacent to each other in the third direction as the plurality of sensing process electrodes.

5. The display device according to claim 4, wherein, in the first sensing process, the sensing unit selects some of the plurality of first electrodes which are not adjacent to each other in any of the third direction and the fourth direction as the plurality of sensing process electrodes.

6. The display device according to claim 1, further comprising:

a plurality of scanning lines which overlap the plurality of first electrodes when seen in a plan view, wherein the sensing unit performs the first sensing process in a state where each of the plurality of scanning lines is electrically floating.

7. The display device according to claim 1, further comprising:

a plurality of scanning lines which overlap the plurality of second electrode groups when seen in a plan view;

a scanning signal output circuit which outputs a scanning signal input to the plurality of scanning lines; and a switching unit which switches a connection state of the scanning signal output circuit and the plurality of scanning lines, wherein the switching unit includes a plurality of second field effect transistors which connect each of the plurality of scanning lines and the scanning signal output circuit, each of the plurality of second field effect transistors includes a second gate electrode, an output of the voltage supply circuit is input to the second gate electrode of each of the plurality of second field effect transistors, the second field effect transistor is in an off state when the second gate voltage is input to the second gate electrode, and the sensing unit supplies the second voltage from the voltage supply circuit to the second gate electrode of each of the plurality of second field effect transistors and performs the first sensing process in a state where each of the plurality of scanning lines is electrically floating.

8. An input device comprising:

a substrate;

a plurality of first electrodes provided in a matrix pattern on the substrate when seen in a plan view; and a sensing unit which senses electrostatic capacitance of each of the plurality of first electrodes; and a plurality of second electrode groups arranged in a fifth direction when seen in a plan view, wherein the sensing unit performs a first sensing process of selecting all or part of the plurality of first electrodes as a plurality of sensing process electrodes and collectively sensing electrostatic capacitance of each of the plurality of selected sensing process electrodes, thereby sensing an approach or a contact of an object to the substrate, in a case where the approach or the contact of the object has not been sensed in the first sensing process, the sensing unit repeats the first sensing process, and in a case where the approach or the contact of the object has been sensed in the first sensing process, the sensing unit performs a second sensing process of sensing a position of the object by individually sensing the electrostatic capacitance of each of the plurality of first electrodes, wherein the sensing unit includes:

a sensing circuit which senses electrostatic capacitance of each of the plurality of first electrodes; and a connection circuit which connects each of the plurality of first electrodes to the sensing circuit, in the first sensing process, the sensing unit collectively senses the electrostatic capacitance of each of the plurality of sensing process electrodes by connecting each of the plurality of selected sensing process electrodes to the sensing circuit via the connection circuit, and in the second sensing process, the sensing unit individually senses the electrostatic capacitance of each of the plurality of first electrodes by sequentially switching and connecting the plurality of first electrodes one by one or in units of several first electrodes to the sensing circuit via the connection circuit, and wherein each of the plurality of second electrode groups includes the plurality of first electrodes arranged in a sixth direction crossing the fifth direction when seen in a plan view, the connection circuit includes a plurality of transistor groups which connect each of the plurality of second electrode groups to the sensing circuit, each of the plurality of transistor groups includes a plurality of first field effect transistors, each of the plurality of first field effect transistors includes a first gate electrode, in each pair of the second electrode groups and the transistor groups, the plurality of first field effect transistors included in the transistor group connect each of the plurality of first electrodes included in the second electrode group to the sensing circuit, the connection circuit further includes:

a plurality of unit register circuits which supply a first gate voltage of the first field effect transistor to each of the plurality of transistor groups;

a voltage supply circuit which supplies a second gate voltage of the first field effect transistor to each of the plurality of transistor groups; and a plurality of OR circuits which calculate an OR of an output of the voltage supply circuit and an output of each of the plurality of unit register circuits, the plurality of unit register circuits form a shift register circuit, in each set of the transistor groups, the unit register circuits and the OR circuits, an output of the OR circuit is input to the first gate electrode of each of the plurality of first field effect transistors included in the transistor group, the first field effect transistor is in an on state even when any of the first gate voltage and the second gate voltage is input to the first gate electrode, and in the first sensing process, the sensing unit selects the plurality of first electrodes included in each of the plurality of second electrode groups as the plurality of sensing process electrodes by supplying the second gate voltage from the voltage supply circuit.

9. The input device according to claim 8 further comprising:

a plurality of first electrode groups arranged in a first direction when seen in a plan view, wherein each of the plurality of first electrode groups includes the plurality of first electrodes arranged in a second direction crossing the first direction when seen in a plan view, and in the first sensing process, the sensing unit selects part of the plurality of first electrode groups as a plurality of sensing process electrode groups, and selects the plurality of first electrodes included in each of the plurality of selected sensing process electrode groups as the plurality of sensing process electrodes.

10. The input device according to claim 9, wherein, in the first sensing process, the sensing unit selects the plurality of first electrode groups which are not adjacent to each other as the plurality of sensing process electrode groups.

11. The input device according to claim 8, wherein the plurality of first electrodes are arranged in a matrix pattern in a third direction and a fourth direction which cross each other when seen in a plan view, and in the first sensing process, the sensing unit selects some of the plurality of first electrodes which are not adjacent to each other in the third direction as the plurality of sensing process electrodes.

12. The input device according to claim 11, wherein, in the first sensing process, the sensing unit selects some of the plurality of first electrodes which are not adjacent to each other in any of the third direction and the fourth direction as the plurality of sensing process electrodes.

* * * * *